Inventor
Lester S. Macdonald
By his Attorney

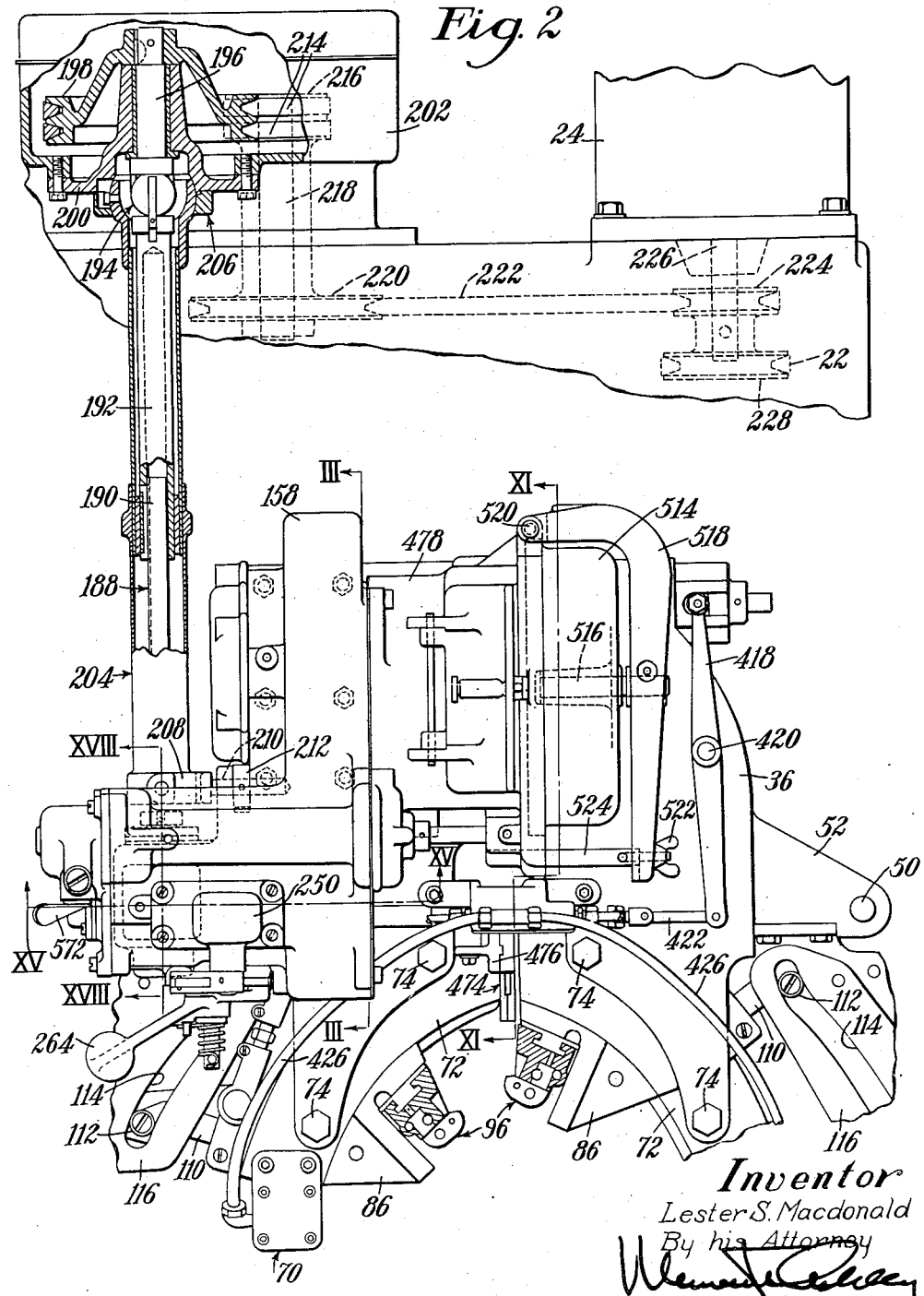

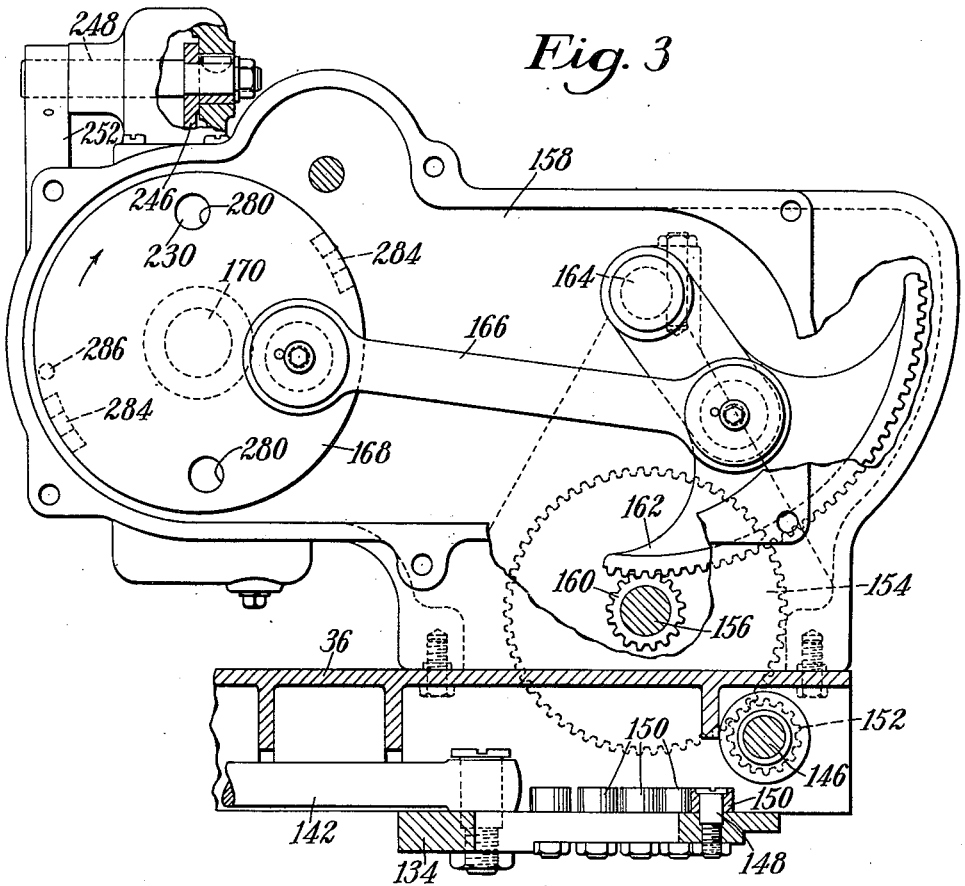
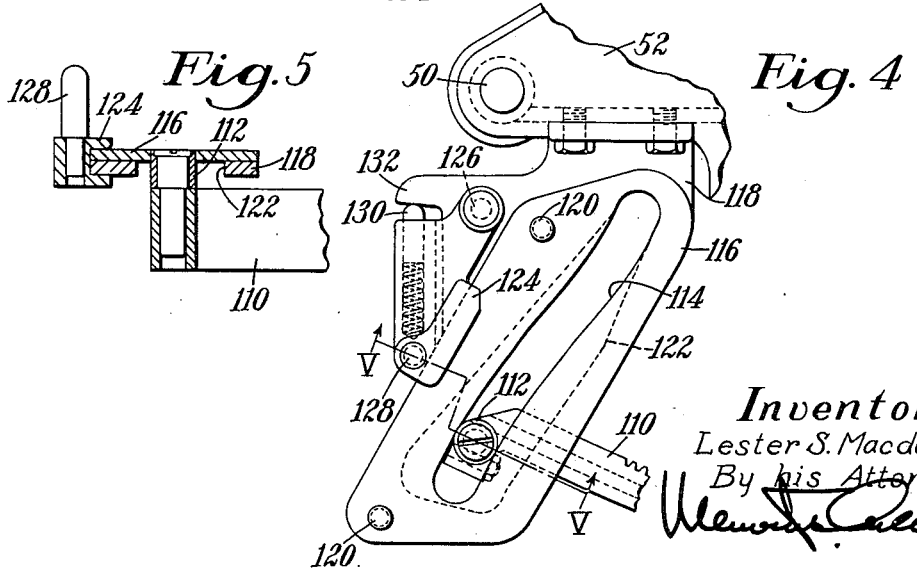

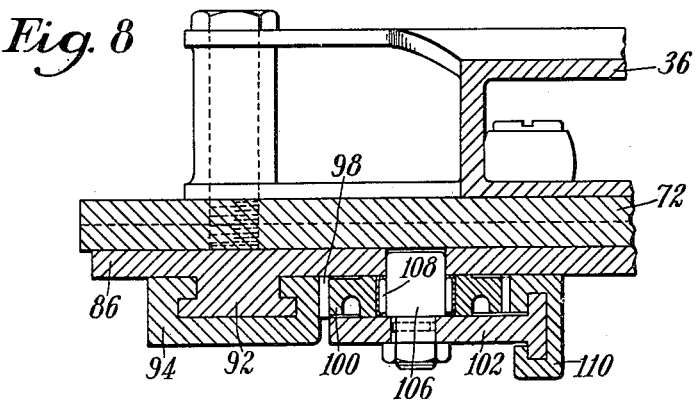
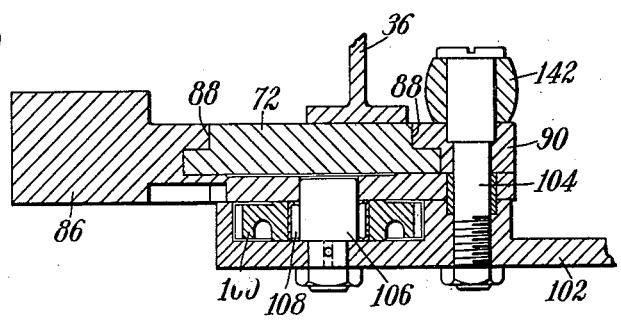
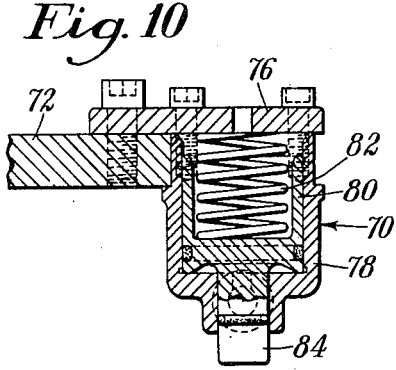

Oct. 10, 1950 L. S. MACDONALD 2,524,817
FASTENING INSERTING MACHINE
Original Filed Feb. 28, 1948 13 Sheets-Sheet 6
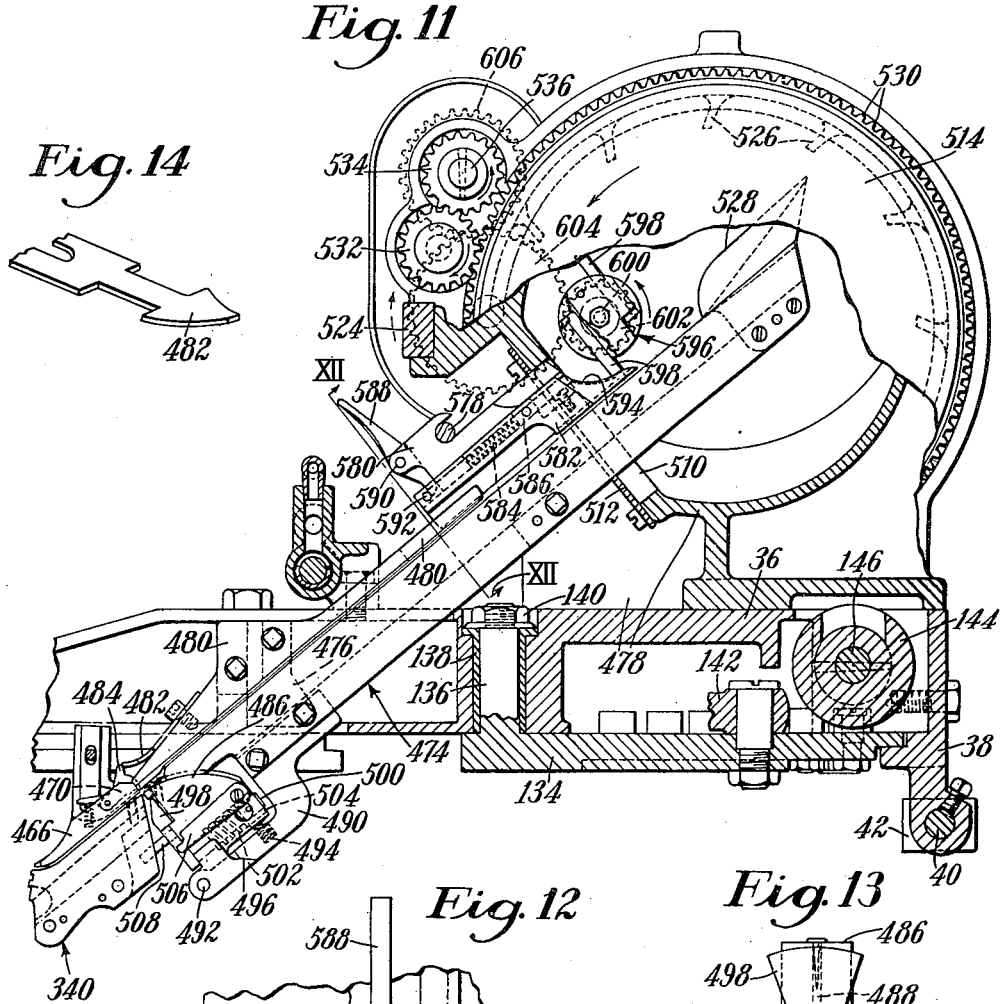
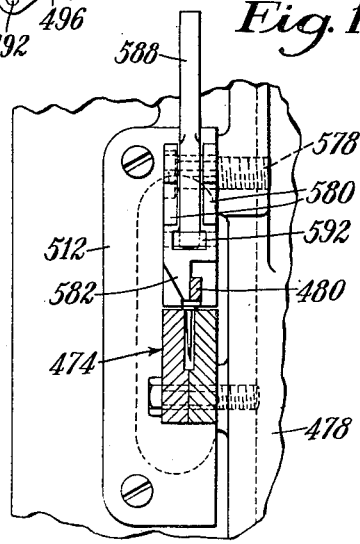
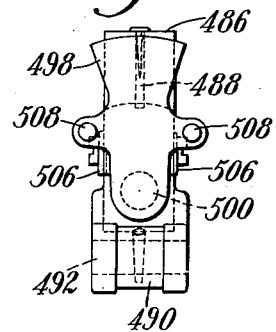
Inventor
Lester S. Macdonald
By his Attorney Oct. 10, 1950 L. S. MACDONALD 2,524,817
FASTENING INSERTING MACHINE
Original Filed Feb. 28, 1948 13 Sheets-Sheet 7

Inventor
Lester S. Macdonald
By his Attorney

Oct. 10, 1950          L. S. MACDONALD          2,524,817
FASTENING INSERTING MACHINE
Original Filed Feb. 28, 1948                13 Sheets-Sheet 8
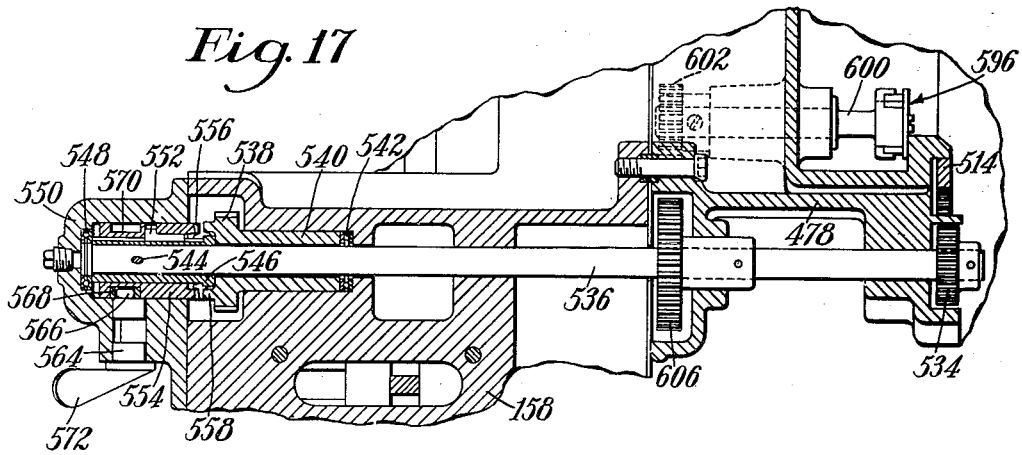
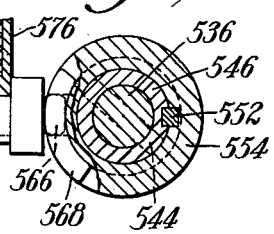
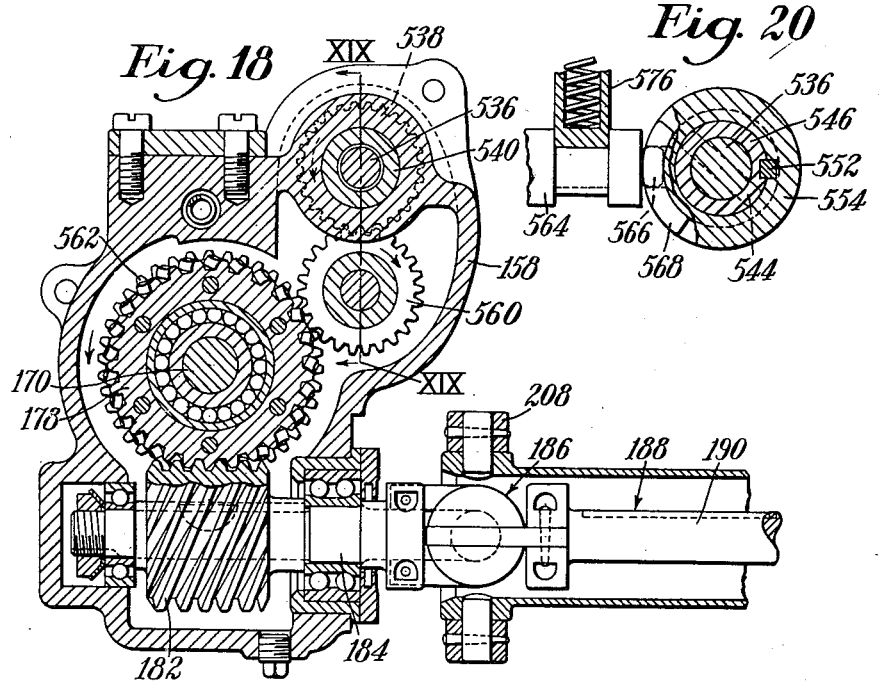
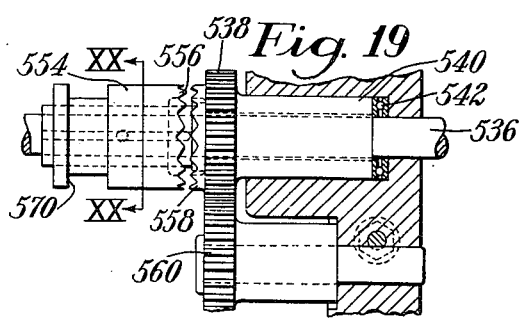
*Inventor*
Lester S. Macdonald
By his Attorney

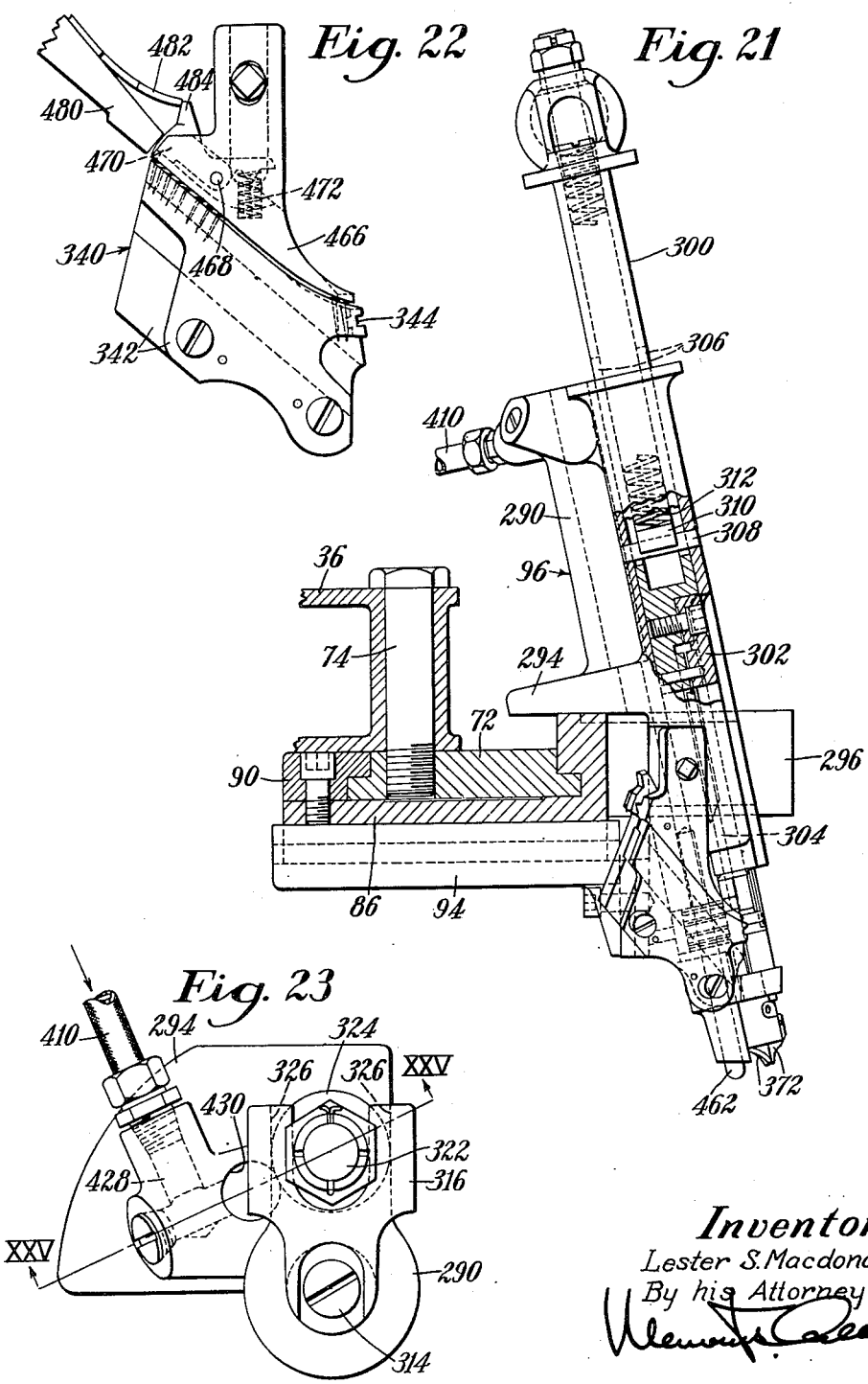

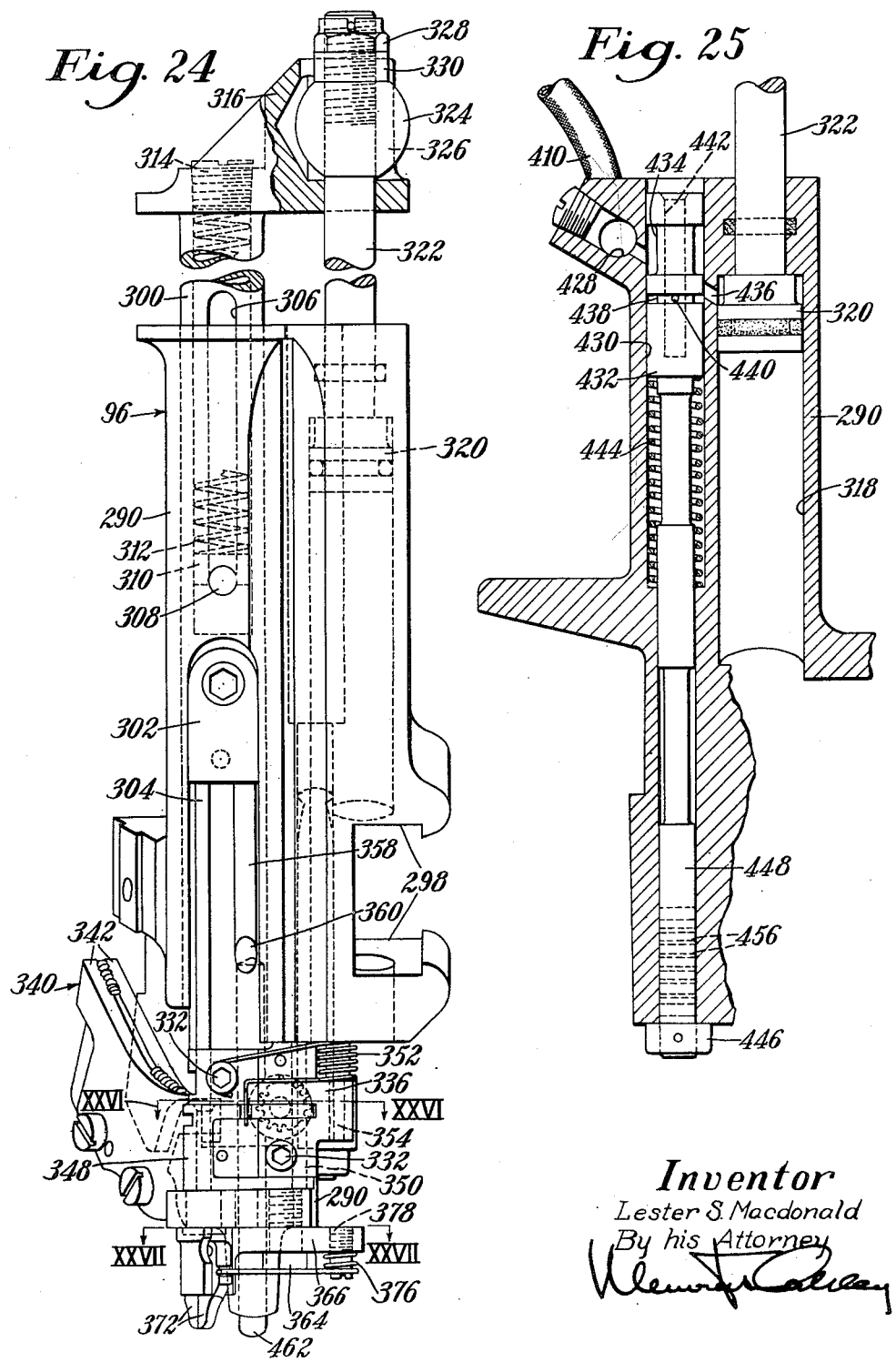

Oct. 10, 1950 L. S. MACDONALD 2,524,817
FASTENING INSERTING MACHINE
Original Filed Feb. 28, 1948 13 Sheets-Sheet 11

Inventor
Lester S. Macdonald
By his Attorney

Oct. 10, 1950          L. S. MACDONALD          2,524,817
FASTENING INSERTING MACHINE

Original Filed Feb. 28, 1948          13 Sheets-Sheet 12

*Inventor*
Lester S. Macdonald
By his Attorney

Oct. 10, 1950     L. S. MACDONALD     2,524,817
FASTENING INSERTING MACHINE

Original Filed Feb. 28, 1948     13 Sheets-Sheet 13

Inventor
Lester S. Macdonald
By his Attorney

Patented Oct. 10, 1950

2,524,817

UNITED STATES PATENT OFFICE 2,524,817

FASTENING-INSERTING MACHINE

Lester S. Macdonald, Beverly, Mass., assignor to United Shoe Machinery Corporation, Flemington, N. J., a corporation of New Jersey Original application February 28, 1948, Serial No. 11,912. Divided and this application March 24, 1949, Serial No. 83,259

32 Claims. (Cl. 1—18.1)

This invention relates to fastening-inserting machines, the present application being a division of a copending application for Letters Patent for improvements in Lasting Machines, Serial No. 11,912, filed on February 28, 1948. The invention is herein shown as applied to a machine for lasting the toe ends of shoes, as more fully disclosed in the copending application, but it will be understood that it is not limited to machines of that kind.

The invention provides novel means for inserting fastenings in succession along the margin of the shoe bottom. In the construction shown the fastening-inserting means includes two fastening-inserting devices arranged to insert fastenings respectively along the opposite side porions of the toe end of the shoe bottom, and mechanism for moving the two devices simultaneously to different fastening-inserting positions, one of them being thus moved to positions successively farther from the extreme end of the toe and the other to positions successively nearer the extreme end in operating on a given shoe. In operating on the next shoe the directions in which the two devices are thus moved are reversed. For imparting the positioning movements to the two devices they are connected by links to a member mounted to swing about an axis extending heightwise of the shoe, this member having thereon a series of projections engaged successively by a rotatable groove cam so formed as to cause the devices to pause in their fastening-inserting positions until the fastenings are inserted. The cam is rotated in one direction in operating on one shoe and in the opposite direction in operating on the next shoe. In order that the fastenings will be inserted at the proper distances from the edge of the shoe bottom, there is further provided means for supporting the fastening-inserting devices for inward or outward movements in directions transverse to the edge of the shoe bottom, together with cam members appropriate for the style and size of shoe being operated upon for controlling the devices with respect to such movements as they are carried along the margin of the shoe bottom.

Each of the fastening-inserting devices herein shown includes an inclined raceway for fastenings and means for delivering fastenings one by one from the raceway. To maintain the required supply of fastenings in these raceways the construction shown is further such that substantially at the end of the fastening-inserting operations on each shoe the raceway of that fastening-inserting device which, in its positioning movements along the edge of the shoe bottom, approaches the end of the toe is carried laterally into alinement with an inclined supply raceway to receive a fresh supply of fastenings, a gate member at the lower end of the supply raceway and a tack retainer at the upper end of the movable raceway being displaced by the movement of the latter raceway into alinement with the supply raceway. To avoid any possible damage if any misplaced fastening should interfere with the proper alinement of the raceways, the lower end portion of the supply raceway is made yieldable in a direction lengthwise of that raceway.

The above and other features of the invention, including various novel details of construction and combinations of parts, will now be more particularly described with reference to the accompanying drawings and thereafter pointed out in the claims.

In the drawings:

Fig. 2 is a plan view of the fastening-inserting means and of other portions of the machine associated therewith, with parts broken away;

Fig. 3 is a section on the line III—III of Fig. 2, showing a portion of the means for moving the fastening-inserting devices to different positions.

Fig. 4 is a plan view of a portion of the means provided for controlling the left-hand fastening-inserting device with respect to movements in directions transverse to the edge of the shoe bottom;

Fig. 5 is a section on the line V—V of Fig. 4;

Fig. 8 is a section on the line VIII—VIII of Fig. 6;

Fig. 9 is a section on the line IX—IX of Fig. 6;

Fig. 10 is a section on the line X—X of Fig. 6;

Fig. 11 is a view partly in right-hand side elevation and partly in section on the line XI—XI of Fig. 2, showing means for feeding the fastenings;

Fig. 12 is a section on line XII—XII of Fig. 11;

Fig. 13 is a view in elevation of means provided for controlling delivery of fastenings to the fastening-inserting devices;

Fig. 14 is a perspective view of a member shown in Fig. 11;

Fig. 17 is a section on the line XVII—XVII of Fig. 16;

Fig. 18 is a section on the line XVIII—XVIII of Fig. 2 on an enlarged scale;

Fig. 19 is a section on the line XIX—XIX of Fig. 18;

Fig. 20 is a section on the line XX—XX of Fig. 19;

Fig. 21 shows in elevation the right-hand fastening-inserting device as viewed from the left-hand side of the machine with the device in the position farthest from the end of the toe, parts being broken away and others shown in vertical section;

Fig. 22 is an enlarged view in elevation of a portion of the structure shown in Fig. 21;

Fig. 23 is a view from above of the device shown in Fig. 21;

Fig. 24 shows the same device in front elevation;

Fig. 25 is a section on the line XXV—XXV of Fig. 23, showing additional valve means for controlling the operation of the device;

Figure 1:
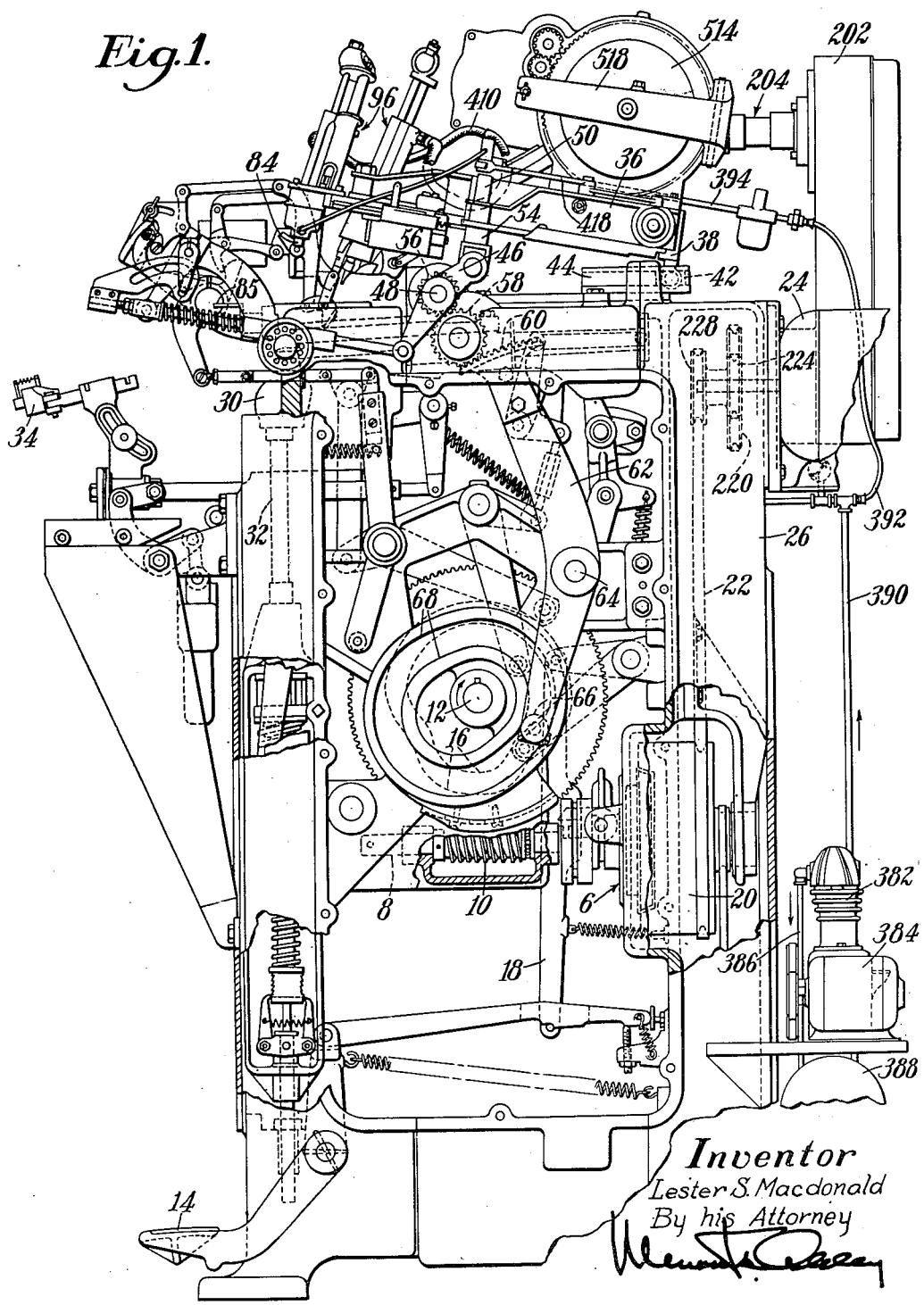
Fig. 1 is a view in right-hand side elevation of the machine in which the invention is herein shown as embodied, with parts broken away.

As more fully disclosed in the copending application of which this application is a division, the machine in which the invention is herein shown as embodied includes a pair of toe-embracing wipers 2 (Figs. 30 and 32) which are moved bodily lengthwise of the shoe and are swung inwardly widthwise of the shoe to wipe the marginal portion of the upper around the toe end of the shoe into lasted position, these wipers having a series of openings 4 extending through them to receive members whereby fastenings, herein shown as tacks $t$, are driven to fasten the upper in lasted position. The machine is operated and controlled through mechanism substantially like that shown and described in United States Letters Patent No. 2,160,846, granted on June 6, 1939, on an application of F. C. Eastman and A. F. Pym. This mechanism includes a clutch 6 (Fig. 1) for driving a shaft 8 which is connected by gearing 10 to a cam shaft 12, one complete revolution of this cam shaft corresponding to what is hereinafter referred to as a cycle of operations of the machine. The clutch is actuated to start the cycle of operations by depression of a treadle 14, after which it is automatically controlled by a stop cam 16 on the cam shaft 12, this cam being arranged to act on the clutch through a member 18 corresponding to the member 834 shown in the above-mentioned Letters Patent. In the construction herein shown this stop cam is so formed that there is only one pause between the beginning and the end of the cycle of operations, namely after the wipers 2 have wiped the margin of the upper inwardly over the insole and while they are holding it in lasted position, to allow time for the action of the independently operated fastening-inserting mechanism hereinafter described. After the fastening-inserting operation the operator again depresses the treadle to cause the machine to complete the cycle. In the construction herein shown one member 20 of the clutch 6 is continuously rotated through a belt 22 by an electric motor 24 mounted on the rear of the frame 26 of the machine near the top of the frame.

For positioning the shoe heightwise in the machine there is provided a shoe-bottom rest comprising a plate 28 (Figs. 30 and 32) supported as described in the copending application and against which the operator positions the bottom of the forepart of the insole when he presents the shoe to the machine, the position of the shoe lengthwise at this time being determined as further disclosed in said application. Substantially at the beginning of the cycle of operations the shoe is clamped against the plate 28 by upward movement of a toe rest 30 supported on a vertically movable rod 32. Near the beginning of the cycle also a heel rest 34 is moved rearwardly into engagement with the heel-end face of the shoe.

Figure 6:
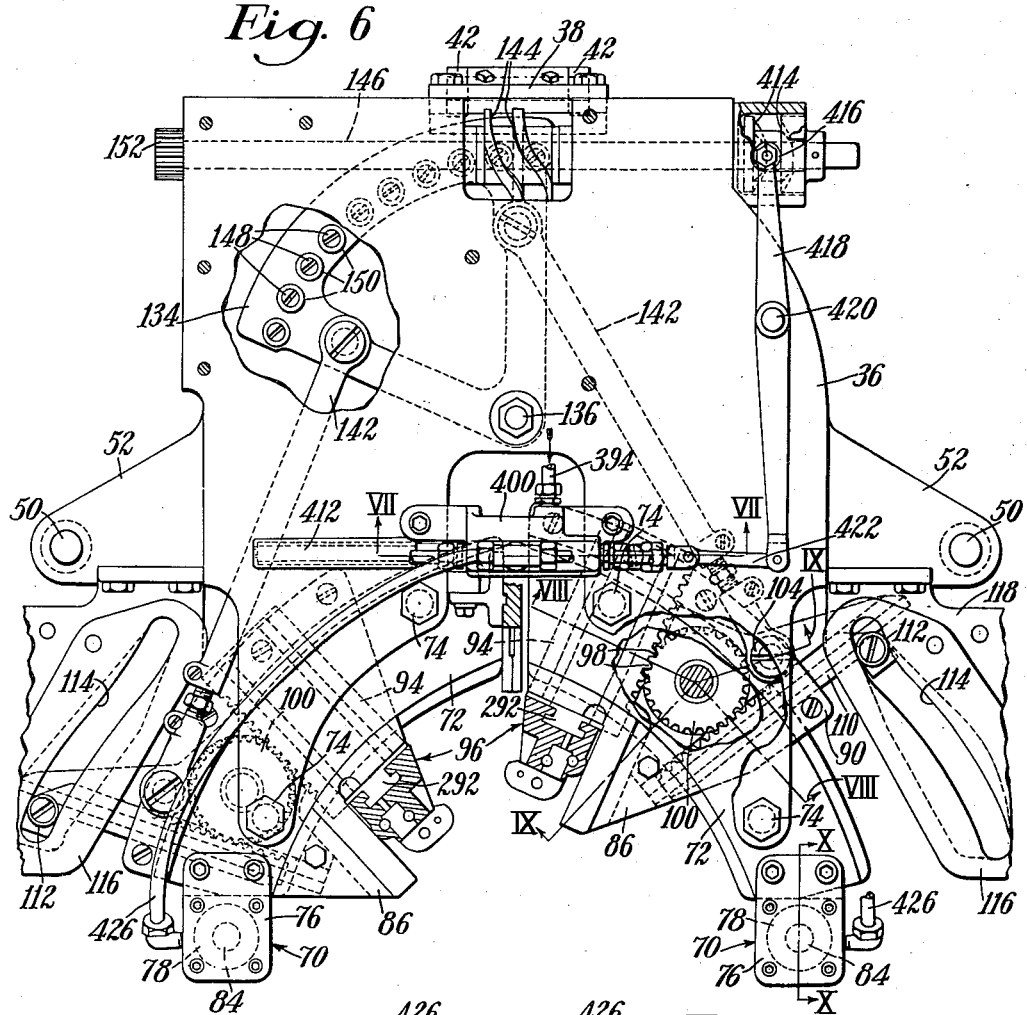
Fig. 6 is a view partly in plan and partly in section of a portion of the fastening-inserting means.

The fastening-inserting mechanism by which the toe end of the upper is secured in lasted position is mounted on a support 36 (Figs. 1 and 6). Since the machine shown is constructed to drive tacks, this support may be termed a tacker support. Secured thereon is a member 38 having a downwardly extending portion in which is fastened a pin 40 (Fig. 11). Mounted on the opposite ends of this pin are two blocks 42 (Fig. 6) arranged to serve as carriers for the support 36 and to move in directions lengthwise of the shoe along guideways formed in a member 44 (Fig. 1) fast on the top of the frame of the machine. The tacker support 36 is therefore pivotally mounted on the blocks 42 for swinging movements heightwise of the shoe and is movable bodily with the blocks in directions lengthwise of the shoe. Both these movements are imparted to the support by a pair of crank arms 46 fast on a shaft 48 mounted to turn in bearings on the top of the frame, one of these crank arms being shown in Fig. 1. The crank arms are pivotally connected to the lower ends of studs 50 which extend upwardly through lugs 52 (Fig. 6) on the sides of the support 36 and have diametrically enlarged lower end portions 54 (Fig. 1) on which the support rests. It will thus be seen that when the shaft 48 is rotated in a counterclockwise direction with reference to Fig. 1, the tacker support 36 is advanced lengthwise of the shoe and is swung downwardly to carry the tackers (hereinafter described) into positions to operate on the shoe. For thus rotating the shaft there is fast thereon a pinion 56 engaged by another pinion 58 which, in turn, is engaged by the teeth of a gear sector 60 fast on the upper end of a lever 62. This lever is mounted to swing about a rod 64 on the frame and has on its lower end a roll 66 engaged by a groove cam 68 on the cam shaft 12. By this cam the lever 62 is swung to move the tacker support 36 as above described at the proper time in the cycle of operations. To limit this movement of the tacker support there are provided two stop devices 70 (Figs. 6 and 10) fastened to plates 72 which are secured by screws 74 to the support 36 for a purpose hereinafter described. Each of the stop devices includes a plate 76 secured to the corresponding plate 72, and fastened on the lower face of the plate 76 is a small cylinder 78. Movably mounted in this cylinder is a piston or plunger 80 held normally at the lower end of the cylinder by a spring 82 and having a stem 84 extending downwardly through a bore in the lower end of the cylinder. To limit the movement of the tacker support 36 the stems 84 engage plates 85 which are supported on the frame, one of these plates being shown in Fig. 1. The springs 82 are of such strength that they are not compressed by the weight of the support 36 and the parts thereon, and accordingly the position of the support heightwise of the shoe is determined by the engagement of the stems 84 with the plates 85. The studs 50 are slidingly mounted in the holes in the support 36 through which they extend, and after the downward movement of the support has been stopped by engagement of the stems 84 with the plates the arms 46 receive some further movements and thereby move the studs downwardly to space their diametrically enlarged portions 54 somewhat below the lower surface of the support for a purpose which will hereinafter be evident.

The two plates 72 are curved to approximate the curvature of the edge of the toe end of the shoe bottom, and each of them serves as a guide for a slide 86 (Fig. 6) which is supported thereon. Each of these slides extends across the corresponding plate 72 below the latter, as shown in Fig. 9, and a portion thereof extends into a groove 88 formed in the plate along the inner edge of the plate. Extending into a similar groove 88 formed along the outer edge of the plate is a gib 90 which is secured to the slide 86. Each slide has a downwardly extending T-shaped portion 92 (Fig. 8) on which is rectilinearly movable in inward and outward directions transversely of the edge of the shoe bottom another slide 94, and supported on the inner end of this slide is a fastening-inserting device or tacker identified generally by the reference character 96 (Fig. 6) and hereinafter described in detail. Each tacker is therefore carried to different tacking positions along the edge of the shoe bottom by movement of its supporting slide 86 along the curved guide plate 72, and the distance from the edge of the shoe bottom at which each tack $t$ is driven is determined by the position of the slide 94 relatively to the slide 86. For controlling each slide 94 there are formed thereon rack teeth 98 which are engaged by a pinion 100 supported by a plate 102 (Fig. 9), this plate being secured by a bolt 104 to the slide 86. The pinion turns about a stud 106 which is secured to the plate 102 and extends upwardly into a recess in the slide 86, and between the stud and the pinion is a roller bearing 108. The pinion is also engaged by a rack bar 110 which is guided for rectilinear movements on the plate 102, as shown in Fig. 8. Mounted on this rack bar is a roll 112 (Fig. 6) which lies in a cam slot 114 formed in a cam plate 116. As shown in Fig. 4, this cam plate is supported on a bracket 118 which is secured to one of the lugs 52 on the tacker support 36, and it is positioned in proper relation to the bracket by two pins 120 extending upwardly from the bracket into holes in the plate. The bracket has therein a slot 122 which is wider than the cam slot 114, and the roll 112 extends upwardly through this wider slot into the cam slot, as shown in Fig. 5. To hold the cam plate securely in place on the pins 120, there is provided a retaining member 124 formed to overlap both the cam plate and the bracket 118, as shown in Fig. 5, this member being pivotally mounted on a pin 126 on the bracket to permit it to be swung when desired into position to release the cam plate. A pin 128 extending upwardly from the member 124 permits the operator thus to swing it into releasing position. It is held normally in operative position by a spring-pressed pin 130 which is mounted therein and engages a lug 132 on the bracket 118. It will be understood that the distance from the edge of the shoe bottom at which each tack is driven is determined positively by the cam plate 116, and for shoes that differ substantially as to size or style different cam plates are substituted.

For imparting to the tackers their movements lengthwise of the edge of the shoe bottom, a triangular sector 134 (Figs. 3, 6 and 11) is pivotally mounted on the tacker support 36 in a position below the support, the sector having formed thereon an upwardly extending pivot pin 136 mounted in a bushing 138 in the support and confined in the bushing by a nut 140. This sector is connected by two links 142 (Fig. 6) to the respective slides 86, the links being mounted on the upper end portions of the previously mentioned bolts 104 (Fig. 9) carried by the slides. By reference to Fig. 6 it will be seen that by swinging movement of the sector in either direction one of the tackers 96 is moved along the margin of the shoe bottom in a direction away from the extreme end of the toe and the other tacker is moved simultaneously in a direction toward the extreme end of the toe. One of the tackers accordingly drives its first tack approximately at the extreme end of the toe, as more fully hereinafter explained, and drives its other tacks thereafter in locations successively farther from the extreme end of the toe, while at the same time the other tacker drives its first tack in the location farthest from the end of the toe and drives its other tacks thereafter in locations successively nearer the end of the toe. In operating on the next shoe the directions of the movements of the tackers are reversed, the first-mentioned tacker approaching the end of the toe and the other moving away from the end of the toe. For operating the sector 134 thus to move the two tackers simultaneously to their successive tacking positions there is provided a groove cam 144 (Figs. 6 and 11) fast on a shaft 146 which is mounted to turn in bearings in the tacker support 36, the shaft being confined against lengthwise movement. Extending upwardly from the sector 134 are a plurality of studs 148 on which are mounted rolls 150 arranged in a series (Figs. 3 and 6). These rolls may be termed projections on the sector. As the cam 144 is rotated it engages these different rolls successively and thereby swings the sector 134 intermittently to impart to the tackers step-by-step movements to their different tacking positions, the cam being so formed that the tackers are held stationary in such positions long enough for the tacks to be driven before they are moved to the next positions.

For rotating the shaft 146 alternately in opposite directions there is fast on one end thereof a pinion 152 (Figs. 3 and 6) engaged by a gear wheel 154 which is fast on a shaft 156 mounted in bearings in a housing 158 on the top of the tacker support 36. Also fast on the shaft 156 is a pinion 160 in engagement with a gear sector 162 which is fast on a shaft 164 also mounted to turn in bearings in the housing. This gear sector is connected by a link 166 to a disk 168 (see Fig. 15) formed integral with a shaft 170 rotatable in bearings in the housing 158. Mounted on this shaft is a clutch 172 comprising a member 174 splined on the shaft to turn therewith and to move lengthwise thereof and a member 176 secured to a worm gear 178 rotatable on ball bearings 180 on the shaft. The two clutch members 174 and 176 have teeth thereon through which the member 174 and the shaft 170 are rotatated when the member 174 is moved toward the left with reference to Fig. 15 into engagement with the member 176. The worm gear 178 is engaged by a worm 182 (Figs. 15 and 18) fast on a short shaft 184. This shaft is connected by a universal joint 186 to a telescopic shaft 188 consisting of two telescoping parts 190 and 192 (Fig. 2), the part 192 being connected by a universal joint 194 to a short shaft 196 on which is secured a pulley 198. The shaft 196 is mounted in a bearing formed in a member 200 which is secured to a housing 202 fast on the frame of the machine (Fig. 1). Surrounding the telescopic shaft 188 is a telescopic housing 204 the rear end of which is supported in a spherical bearing 206 on the member 200 and the front end of which is pivotally connected to a yoke 208 (Figs. 2 and 18) provided with a stem 210 mounted to turn in the housing 158. A collar 212 mounted in a recess in the housing and fast on the stem holds the yoke in place while permitting it to turn. It will be understood that the telescopic shaft 188 and the telescopic housing 204 permit the previously described movements of the tacker support 36 while an operating connection it maintained by the shaft between the worm 182 and the pulley 198. This pulley is driven continuously by two V-belts 214 from a pulley 216 fast on a shaft 218 on which is also secured a pulley 220 driven by a V-belt 222 from a pulley 224 on the shaft 226 of the previously mentioned electric motor 24, this shaft having also thereon a pulley 228 which drives the previously mentioned belt 22 (Fig. 1) for operating the clutch 6.

For controlling the clutch 172 (Fig. 15) there is provided a pin 230 slidingly mounted in the housing 158 to move in directions lengthwise of the shaft 170 and connected rigidly by a crosspin 232 to a block 234. Slidingly mounted in lugs 236 on this block is a pin 238 on which is secured a member 240 extending into a groove 242 in the clutch member 174. A spring 244 on the pin 238 holds the member 240 normally in engagement with the left-hand lug 236 as the parts are viewed in Fig. 15. It will thus be seen that the clutch member 174 may be moved into clutching engagement with the member 176 by the member 240 in response to movement of the pin 230 toward the left with reference to Fig. 15 and that the spring 244 is yieldable to permit thereafter any further movement of the pin 230 that may take place. To impart the clutch-actuating movement to the pin 230 there is provided an arm 246 having a rounded lower end extending into a recess in the block 234, the arm being fast on a shaft 248 mounted in a cap 250 on the housing 158. Fast on this shaft outside of the cap is an arm 252 (Fig. 16) having therein a slot 254 through which extends the upper end of a latch member 256 having a shoulder 258 normally in engagement with a plate 260 on the arm. The lower end of the latch member 256 is pivotally mounted on a stud 262 supported on one end of a lever 264 which is pivotally mounted between its opposite ends on a pin 266 on the housing 158. A spring 268 connected to the lever 264 and to the latch member 256 holds the latter normally against the plate 260. The other end of the lever 264 is arranged to be depressed by the operator, and it will be evident that by such movement of the lever the arm 252 is swung in a clockwise direction with reference to Fig. 16 to move the clutch member 174 into engagement with the member 176. The lever 264 is thus movable against the resistance of a spring 270 which is coiled around the pin 266 and is anchored at one end to a stud 272 on the pin, the other end of the spring engaging a pin 274 on the lever and tending to swing the lever in a blockwise direction. The movement of the lever in either direction is limited by a stop pin 276 which extends from the housing 158 into a recess 278 in the lever.

Figure 15:
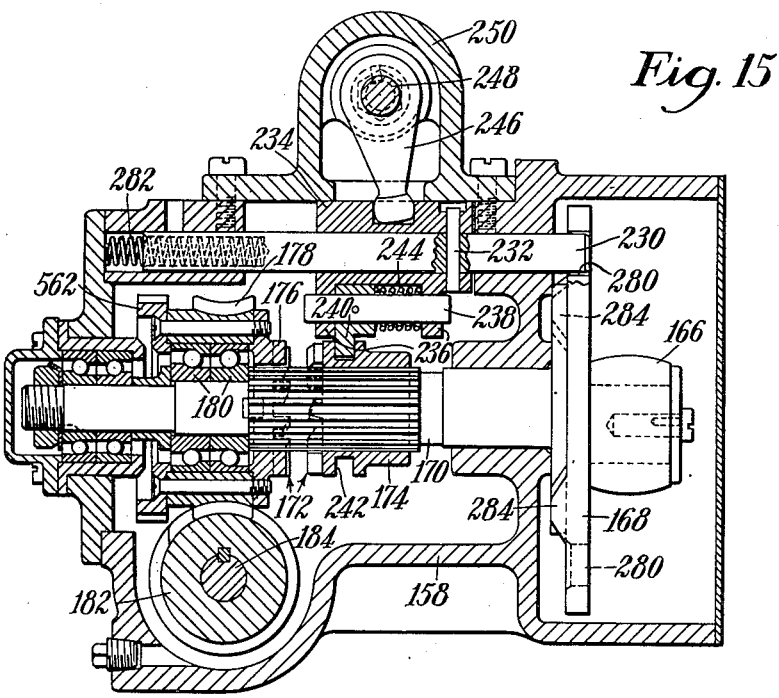
Fig. 15 is a section on the line XV—XV of Fig. 2 on an enlarged scale, showing starting and stopping mechanism for the fastening-inserting means.
Figure 16:
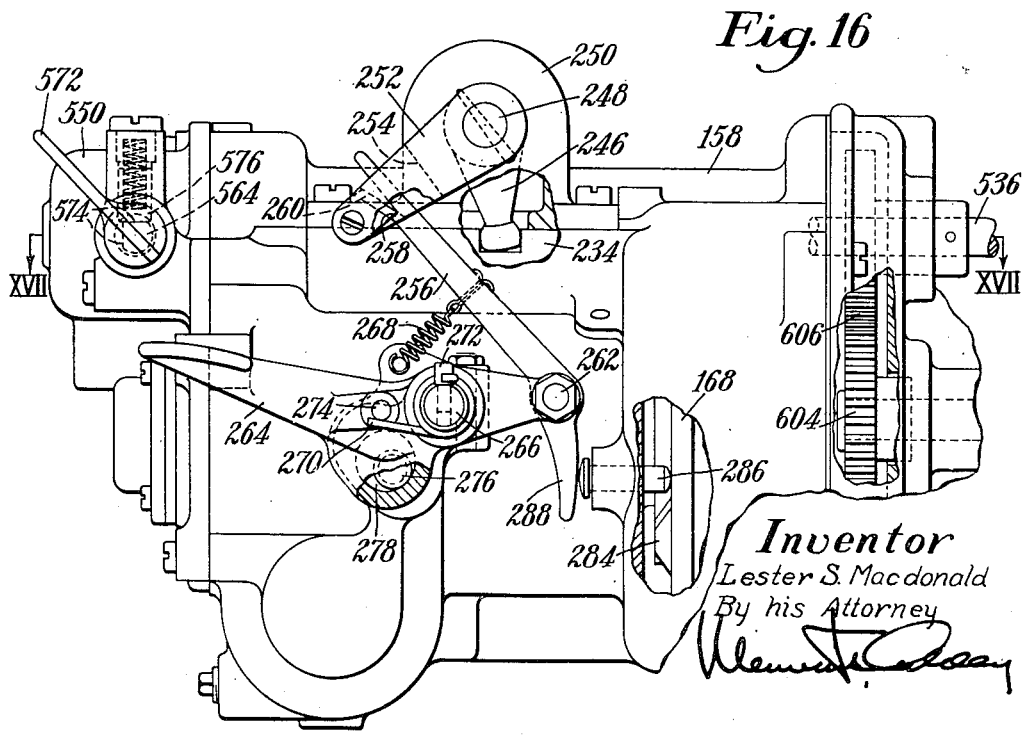
Fig. 16 is a view in front elevation of a portion of the structure shown at the left-hand side of Fig. 2, with parts broken away, also showing portions of the starting and stopping mechanism.

Initially one end of the pin 230 extends into one or the other of two holes 280 formed in the disk 168, as shown in Fig. 15, and when it is moved as above described to connect the clutch member 174 to the member 176 it is withdrawn from the hole in which it lies to permit the rotation of the shaft 170. When the operator releases the lever 264 the pin 230 is pressed by a spring 282 against one face of the disk, and when the next hole 280 arrives in alinement with the pin at the end of a half revolution of the disk the spring 282 moves the pin into that hole and simultaneously disconnects the clutch member 174 from the member 176. It will be understood that a half revolution of the disk is all that is required to move the tackers to their different tacking positions in operating on one shoe. To insure that the disk will not be turned more than a half revolution if the operator should continue to hold the lever 264 depressed, the disk is provided on one face thereof with two cam lugs 284 arranged to engage and operate a pin 286 slidingly mounted in the housing 158. This pin is arranged to engage a tail 288 on the latch member 256 and, when operated by either cam lug, to swing the latch member and thus to disengage it from the plate 260 if the operator is holding the lever 264 depressed. The arm 252 then receives a short reverse movement as the spring 282 moves the pin 230 into engagement with the disk 168, so that the operator must release the lever 264 before the shoulder 258 on the latch member 256 can again engage the plate 260. If the operator has already released the lever 264 before the cam lug operates the pin 286, the latch member merely receives an idle movement as the pin 286 acts thereon. The cam lug, however, is so positioned on the disk 168 as to engage and operate the pin almost immediately after the beginning of the rotation of the disk, as is evident from Fig. 3, the cam lug then passing beyond the pin to permit return of the latch member by the spring 268.

Figure 26:
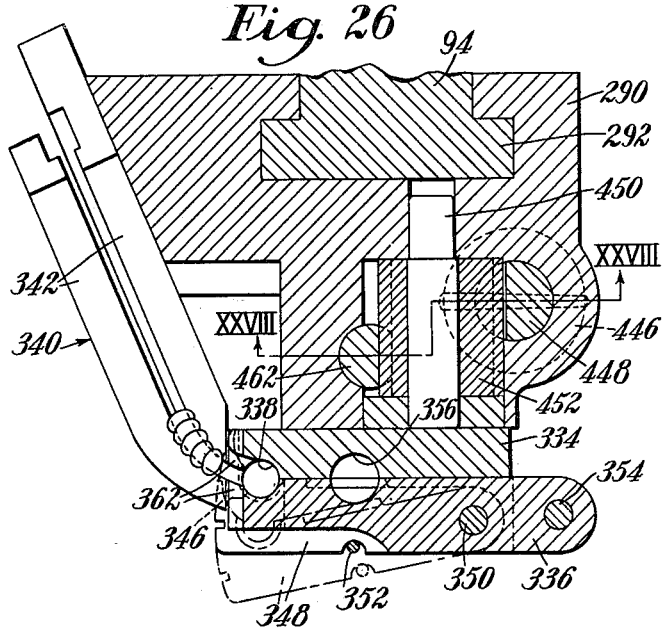
Fig. 26 is a section on an enlarged scale on the line XXVI—XXVI of Fig. 24, showing means for separating the fastenings.

Each of the tackers 96 includes a casting 290 (Figs. 21, 24 and 25) mounted on the inner end of the slide 94, the casting having therein a T-slot in which lies a correspondingly formed projection 292 (Figs. 6 and 26) formed on the slide. A flange 294 (Figs. 21 and 23) on the casting 290 rests on the upper surface of an upwardly extending portion of the slide 86, and an inwardly extending portion 296 of this slide lies in a guideway 298 (Fig. 24) in the casting. The slide 86 therefore assists in guiding the casting 290 as the latter is moved inwardly or outwardly by the slide 94. Mounted in the casting 290 for downward and upward movements is a hollow driver bar 300 and secured on the lower end of this bar by a clamp member 302 is a tack driver 304 for driving a tack controlled by means hereinafter described. Formed in the driver bar are slots 306 through which extends a pin 308 mounted in the casting 290, and resting on this pin is a block 310 on which is seated the lower end of a spring 312 in the driver bar. The spring is confined under compression in the hollow driver bar by a screw 314 (Fig. 24) threaded in a head portion 316 of the bar. It will thus be seen that this spring serves to return the driver after the driving of the tack, its return movement being limited by means hereinafter described. Formed in the casting 290 is a cylinder 318 in which is mounted a piston 320, and extending upwardly from this piston through a bore in the casting is a piston rod 322. This rod also extends upwardly through a hole formed in the head portion 316 of the driver bar 300, and threaded on the upper end portion of this rod is a mainly spherical member 324 in engagement with upwardly and downwardly curved bearing faces 326 (Fig. 23) formed on the head portion 316. The member 324 is locked on the rod by a nut 328 which engages an upwardly extending cylindrical portion 330 of the member. It will thus be seen that the driver bar 300 is moved downwardly to operate the driver by downward movement of the piston 320 and, as shown in Fig. 25, the return movement of the driver bar by the spring 312 is limited by engagement of the piston with the casting 290. In the construction herein shown the piston 320 of each tacker is arranged to be operated by compressed air under control of means hereinafter described.

Secured to the lower end portion of each casting 290 by screws 332 (Fig. 24) are two plates 334 and 336 (Fig. 26) in which is formed a passage 338 in alinement with the driver 304. Also secured to the lower end portion of the casting is a tack raceway 340 comprising two parts 342 fastened together with a slot between them for the shanks of the tacks, the heads of the tacks resting on the upper surfaces of these parts. The lower end of the raceway engages the plates 334 and 336 near the passage 338 and has therein a transverse slot 344 (Fig. 22) to receive a separator finger 346 (Fig. 26) formed on a separator 348 which is pivotally mounted on a pin 350 in the plate 336. Normally the separator 348 is held by a spring 352 in position to close the lower end of the raceway, as shown in full lines in Fig. 26, this spring being coiled around a pin 354 in the plate 336 with one end anchored to one of the screws 332 and the other end engaging the separator. Also formed in the plates 334 and 336 is a passage 356 which is in alinement with a rod 358 (Fig. 24) secured to the driver bar 300 by the clamp 302. This rod has a lower inclined end face 360 arranged to engage the separator 348 and to swing it into position to release the tacks in the raceway 340 when the driver bar is moved downwardly to operate the driver. When the tacks are thus released the driver is in the passage 338, and accordingly the end tack in the raceway moves into a position adjacent to the driver where its head is supported on surfaces 362 (Fig. 26) on the plates 334 and 336. When the driver is thereafter retracted the separator is swung inwardly by its spring 352 to cause its finger 346 to enter the space between the shank of the endmost tack and that of the next tack and to force the endmost tack into the passage 338 as soon as the driver moves upwardly beyond this passage, the finger at the same time closing the raceway.

Figure 27:
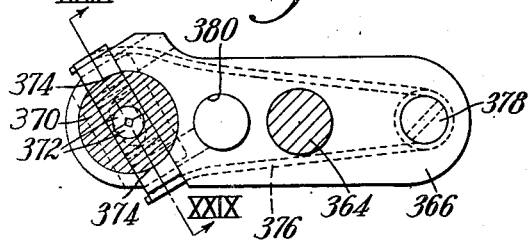
Fig. 27 is an enlarged section on the line XXVII—XXVII of Fig. 24.
Figure 29:
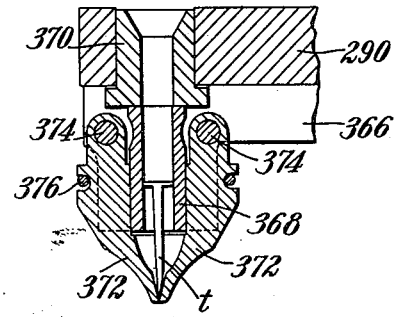
Fig. 29 is a section on the line XXIX—XXIX of Fig. 27, showing a holder for the fastenings.

Secured to the lower end of the casting 290 by a screw 364 (Figs. 24 and 27) is a block 366 a tubular portion 368 of which (Fig. 29) serves as a pocket to receive the tack. This tubular portion is in alinement with the passage 338 (Fig. 26), and between them is a tack-guiding bushing 370 inserted in the lower end portion of the casting 290. To support the tack for the operation of the driver thereon and also to serve as a guide for the tack as it is driven there are provided two tack fingers 372 the upper ends of which lie in a slot in the block 366 and are pivotally mounted on pins 374 in the block. The tack fingers are normally held in tack-supporting positions by a spring 376 which is coiled about a stud 378 in the block and bears on the outer sides of the fingers. Formed in the block is a hole 380 to receive the lower end of the rod 358.

Figure 7:
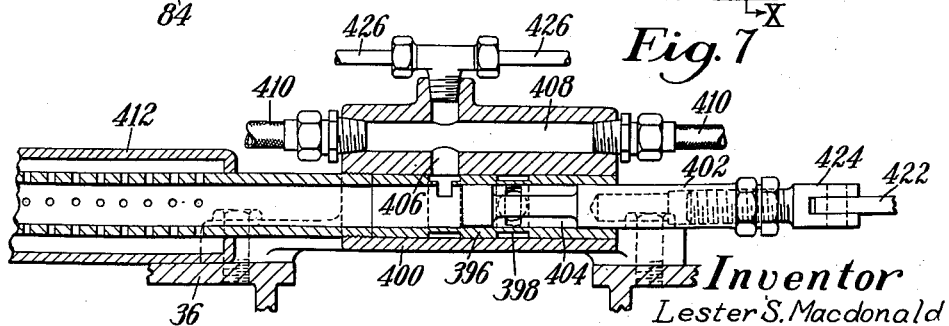
Fig. 7 is a section on the line VII—VII of Fig. 6, showing valve means for controlling the operation of the fastening-inserting devices by compressed air.

The compressed air for operating the pistons 320 to drive the tacks may be obtained from a source of factory supply if such a supply is available. The machine herein shown, however, is provided with an air pump 382 (Fig. 1) supported on the rear of the frame and driven by an electric motor 384. The pump delivers air through a pipe 386 into a reservoir 388 provided with a suitable relief valve (not shown), and leading from this reservoir is a pipe 390 connected by a flexible tube 392 with another pipe 394 which is mounted on the movable tacker support 36 and is in communication with a cylinder 396 (Fig. 7) through a port 398 in the cylinder. The cylinder consists of a sleeve inserted in a casting 400 which is fastened on the top of the tacker support 36. Mounted in the cylinder is a piston valve 402 having therein an annular recess 404 with which the port 398 communicates. Movement of the valve toward the left from the normal position in which it is shown in Fig. 7 serves to establish communication between the port 398 and another port 406 opening into a chamber 408 in the casting 400, this chamber communicating through flexible tubes 410 with the two tackers 96. Return movement of the valve thereafter permits exhaust of the air from the chamber 408 to the atmosphere through a muffler 412. The valve is reciprocated in proper time relation to the movements of the tackers to their diferent tacking positions by a groove cam 414 (Fig. 6) on the shaft 146, this cam engaging a roll 416 mounted on the rear end of a lever 418. The lever is pivotally mounted between its opposits ends on a stud 420 on the tacker support 36, and its front end is connected by a link 422 to a member 424 adjustably connected to the valve 402.

Figure 31:
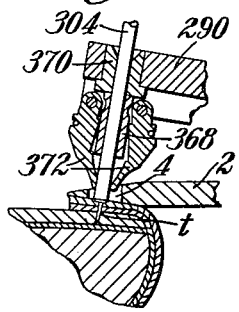
Fig. 31 is a view in vertical section showing a portion of one of the fastening-inserting devices and illustrating the insertion of a fastening in another location in the shoe.

As hereinbefore explained, prior to the tacking operation the tacker support 36 is moved forwardly lengthwise of the shoe and is swung downwardly to a position determined by the engagement of the stems 84 (Figs. 6 and 10) of the pistons 80 with the plates 85 on the frame of the machine. When the tacker support is thus positioned the tack fingers 372 are located slightly above the plane of the top faces of the wipers 2. When the tacks are driven, however, it is desirable, for better control thereof, that the tack fingers be located as close as possible to the margin of the upper. The lower ends of the cylinders 78 in which the pistons 80 are mounted are therefore in communication through pipes 426 with the chamber 408 (Fig. 7). Accordingly, when compressed air is admitted by the valve 402 to the tubes 410 leading to the tackers, it is also admitted to the lower ends of the cylinders 78 and raises the pistons 80 against the resistance of their springs 82. This causes the tacker support 36 to be swung farther downwardly by gravity, thus carrying the tack fingers 372 into the openings 4 in the wipers when they are in alinement with these openings (Fig. 31). When the valve 402 is thereafter moved into position to release the air from the chamber 408 the springs 82 return the pistons 80 to the lower ends of the cylinders 78, thus swinging the tacker support upwardly to a position in which the tack fingers will clear the wipers when the tackers are moved to the next tacking positions.

Figure 28:
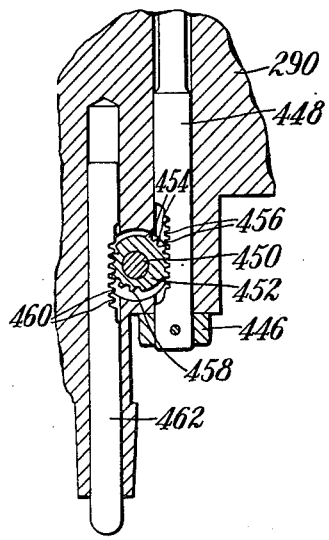
Fig. 28 is a section on the line XXVIII—XXVIII of Fig. 26, showing mechanism for controlling the valve means shown in Fig. 25.

The compressed air conducted to the tackers by the tubes 410 is not admitted directly into the cylinders 318, but is admitted through passages 428 (Figs. 23 and 25) in the castings 290 into cylinders 430 formed in the castings. Mounted in each of these cylinders is a piston valve 432 having an annular recess 434 in constant communication with the passage 428. Initially, as shown in Fig. 25, this annular recess is out of communication with a port 436 which leads from the cylinder 430 into the cylinder 318 above the piston 320. The port 436 is in communication at this time with another annular recess 438 in the valve, this recess communicating through a port 440 in the valve with a passage 442 formed centrally in the valve and leading to the atmosphere. The valve is held in its initial position by a spring 444 which tends to move it upwardly, its position being determined by a collar 446 which is fast on the lower end of a stem 448 on the valve and engages a lower face on the casting 290. It will be understood that in response to downward movement of the valve 432 compressed air is admitted through the port 436 into the cylinder 318 to impart downward movement to the piston 320 and thus to drive the tack. Such downward movement of the valve is effected in response to that downward movement of the tacker support 36 and the tackers which results, as above explained, from the admission of compressed air to the cylinders 78. For this purpose there is rotatably mounted on a pin 450 (Figs. 26 and 28) in the casting 290 a member 452 provided with teeth 454 in engagement with teeth 456 formed on the valve stem 448 and with other teeth 458 in engagement with teeth 460 formed on a rod 462 the lower end of which extends downward to a position somewhat below the casting 290, the teeth 454 being farther from the pin 450 than the teeth 458. When the tacker support 36 is swung to the position determined by engagement of the stems 84 with the plates 85, the lower ends of the rods 462 are carried downward substantially as far as the top faces of the wipers without disturbing the valves 432. When the tacker support thereafter receives its further downward movement in response to the admission of compressed air to the cylinder 78, engagement of the rods 462 with the wipers causes the valves 432 to move downwardly and thus to admit the compressed air above the pistons 320 to operate the tack drivers. It will be evident that since the downward movements of the valves 432 thus depend upon the admission of air to the cylinders 78, the operation of these valves is slightly retarded as compared with the operative movement of the valve 402. When the tacker support is moved upwardly by the springs 82 in response to release of the air from the cylinders 78 after each tacking operation, the valves 432 are returned to their initial positions by the springs 444, exhaust of the air from the cylinders 318 then taking place through the passages 442 in the valves as the driver bars 300 are returned by their springs 312. Exhaust of the air from the cylinders 318 may, however, begin to take place through the annular recesses 434 in the valves 432 as soon as the valve 402 in its movement to exhaust position begins to uncover the port 406 (Fig. 7). The positioning of the teeth 454 on each member 452 farther from the pin 450 than the teeth 458 results in accelerating the downward movements of the valves 432.

In operating on some shoes it may not be desired to drive tacks through all the openings 4 in the wipers. For example, it may not be desired to drive tacks through one or more of the openings in each wiper which are located farthest from the end of the toe. To prevent the driving of such tacks the wipers which are used in operating on those shoes are so formed as to prevent the downward movements of the valves 432 when the tackers are in the positions where they would otherwise drive those tacks. The wipers herein shown, for example, are provided with recesses or slots 464 (Fig. 32) so located as to be immediately below the lower ends of the rods 462 when the tackers are in the positions for driving tacks through the two openings 4 in the different wipers which are farthest from the end of the toe. Accordingly, in the downward movement of the tacker support 36 which takes place in response to the admission of compressed air to the cylinders 78 the lower ends of the rods 462 enter the slots 464 and the valves 432 remain in positions to prevent compressed air from entering the cylinders 318 regardless of the movement of the valve 402 into position to admit the air to the tubes 410. It will be understood that such slots or recesses may be provided in any locations in the wipers to receive the rods 462 and thus to vary as desired the number and arrangement of the tacks which are driven.

To insure that the tacks will not be displaced from each tacker raceway 340 as the tacker is moved to its different tacking positions, a member 466 (Fig. 22) is secured to the casting 290 to serve as a cover over the heads of the tacks. Further to insure that none of the tacks will be displaced from the upper ends of these inclined raceways, there is pivotally mounted on a pin 468 in a recess in each member 466 a tack-retaining member 470 held normally by a spring 472 in position to close the upper end of the raceway.

For supplying the two tacker raceways 340 with tacks there is provided a single tack supply raceway 474 (Fig. 11) the lower portion of which is secured to a bracket 476 (Figs. 2 and 11) fast on the tacker support 36 and the upper portion of which is secured to a housing 478 on the tacker support, this housing being secured to the previously mentioned housing 158 (Fig. 2). Mounted over the raceway 474 is a member 480 which serves as a cover to prevent displacement of the tacks. Substantially at the end of the tacking operations on each shoe one of the tacker raceways 340 is carried by the movement of the corresponding slide 86 into alinement with the tack supply raceway 474 to receive a supply of tacks, a finger 482 (Figs. 11, 14 and 22) fast on the member 480 engaging an upwardly extending portion 484 of the tack-retaining member 470 and swinging this member to open the upper end of the raceway 340. To insure against damage in case any tack should become wedged between the tacker raceway 340 and the raceway 474, there is provided a yieldingly movable block 486 (Figs. 11 and 13) which serves as the lower end portion of the raceway 474 and has therein a groove 488 to receive the shanks of the tacks. A bracket 490 secured to the raceway 474 is provided with a pin 492 on which the lower end portion of the block 486 is pivotally mounted for swinging movements lengthwise of the raceway 474. A spring 494 tends to swing the block in a forward direction about the pin 492, its movement in this direction being limited by engagement of a forked lower portion of the block with shoulders 496 on the bracket 490. In case, therefore, any misplaced tack should prevent one of the tacker raceways 340 from moving freely into alinement with the raceway 474, the block 486 will yield in a rearward direction to permit completion of the movement of the tacker raceway.

To retain the tacks in the tack supply raceway 474 there is provided on the block 486 a gate member 498 which is normally in position to engage the shank of the lowest tack, as shown in Fig. 13. A stem 500 formed on the gate member is mounted to turn in a bearing in the block, and mounted on this stem is a spring 502 which at its front end engages a face on the block and at its rear end engages a collar 504 fast on the stem to hold the gate member pressed rearwardly against the block. Secured to the opposite sides of the block are leaf springs 506 which bear against the opposite sides of the gate member and hold it normally in a central position as shown in Fig. 13. Mounted on the gate member are two forwardly extending pins 508 arranged to be engaged respectively by the different tacker raceways 340 as the latter approach their positions of alinement with the supply raceway to swing the gate member into position to release the tacks in this raceway and thus to permit them to move downward upon the tacker raceway. It will be understood that one of the tacker raceways thus receives a supply of tacks after the operation of the tacking mechanism on one shoe and that the other tacker raceway receives tacks after the operation of the tacking mechanism on the next shoe, each raceway carrying enough tacks to operate on at least two shoes. It will further be understood that as either tacker raceway moves out of alinement with the supply raceway the gate member 498 is returned by one or the other of the springs 506 to its normal position to prevent loss of tacks from the supply raceway and the tack-retaining member 470 is returned into position to close the upper end of the tacker raceway.

The tack supply raceway 474 extends upwardly into a chamber in the housing 478 through an opening 510 (Fig. 11) in the housing, portions of this opening around the raceway being closed by a plate 512. The tacks are supplied to the raceway in a well-known manner by a rotary hopper 514 which, as shown in Fig. 2, is rotatably mounted on a pin 516 supported on an arm 518, this arm being pivotally mounted at 520 on the housing 478 and being held stationary by a wing nut 522 threaded on a pin on the end of a member 524 fast on the housing. The rotary hopper is provided as usual with vanes 526 which lift the tacks and spill them over the raceway 474, the raceway having fast on its upper end a trough 528 to receive the tacks and to assist in directing them into the groove in the raceway. The hopper is provided on its periphery with gear teeth 530 covered by a flange on the housing 478, these teeth being engaged by an idle gear 532 which engages a gear 534 fast on one end of a shaft 536 mounted in bearings in the two housings 478 and 158. Near its other end (Fig. 17) this shaft has rotatably mounted thereon a gear 538 having a sleeve portion 540 extended along the shaft and in engagement at one end with a thrust bearing 542. Fastened to the shaft by a pin 544 (Fig. 20) is a sleeve 546 in engagement at one end with the gear 538 and at the other end with a thrust bearing 548 mounted in a cap 550 on the housing 158. Connected to the sleeve 546 by a spline 552 to slide thereon is a sleeve 554 having on one end thereof clutch teeth 556 arranged to engage similar teeth 558 on the side of the gear 538. The sleeve 554 and the gear 538 therefore serve as clutch members by which the gear may be connected to or disconnected from the shaft 536 to initiate or stop the rotation of the tack hopper 514. The gear 538 is connected by an idle gear 560 (Fig. 18) to a gear 562 (Fig. 15) which is secured to the previously mentioned constantly driven worm gear 178. For moving the sleeve 554 toward or from the gear 538 to start or stop the rotation of the tack hopper there is provided a pin 564 rotatably mounted in the cap 550 and having an eccentric portion 566 extending into a shoe 568 which lies in a peripheral groove 570 in the sleeve 554. On the outer end of the pin is a handle 572 for turning it. The pin has thereon two flat faces 574 (Fig. 16) arranged to be engaged by a spring-pressed plunger 576 (see Fig. 20) mounted in a recess in the cap 550 for holding the sleeve 554 in its different positions.

Secured to the housing 478 by a screw 578 (Figs. 11 and 12) is a member 580 which extends upwardly along the raceway 474 through an opening in the plate 512, and guided by this member for movements lengthwise of the raceway is a slide 582 also extending upwardly through the plate 512 with its upper end portion located just above the heads of the tacks in the raceway. A spring 584 in engagement at its front end with the member 580 and at its rear end with a block 586 fast on the slide 582 tends to move the slide in an upward direction along the raceway, its movement in this direction being limited by engagement of the block 586 with a limiting face on the member 580. A lever 588 pivotally mounted on a pin 590 on the member 580 is in engagement at its lower end with a pin 592 on the slide 582. By this lever, therefore, the slide may be moved downwardly along the raceway by the operator and then released to permit it to be returned by the spring 584 one or more times to clear from over the raceway any tack or tacks which may have become displaced in such manner as to prevent the normal movement of the tacks downwardly along the raceway. The slide 582 is provided with a curved upper face 594, and over this face is positioned a rotary tack clearer 596 provided with fingers 598 movable along the curved face 594 to clear in a well-known manner from over the raceway any tacks which fail to enter the raceway. The tack clearer is mounted on a shaft 600 (Fig. 17) rotatable in a bearing in the housing 478 and having fast thereon a gear 602 in engagement with an idle gear 604 which is engaged in turn by a gear 606 fast on the shaft 536. The tack clearer 596 is therefore driven continuously by the shaft 536 as long as this shaft is rotated.

Figure 30:
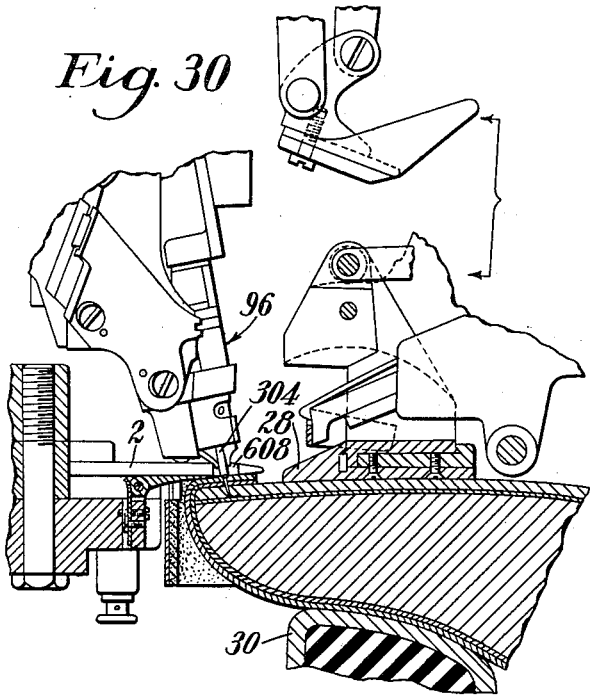
Fig. 30 is a view partly in left-hand side elevation and partly in section, illustrating the insertion of a fastening in one location in a shoe.
Figure 32:
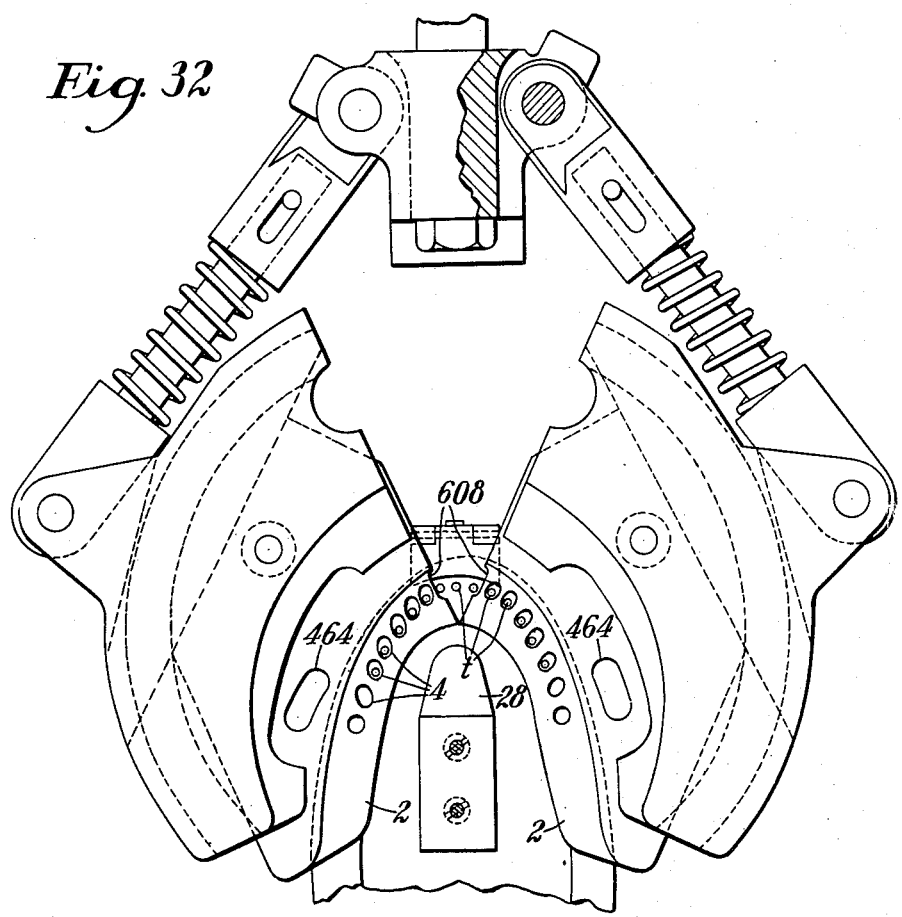
Fig. 32 is a plan view showing a portion of the machine as it appears in relation to the shoe immediately after the fastenings have been inserted.
Figure 33:
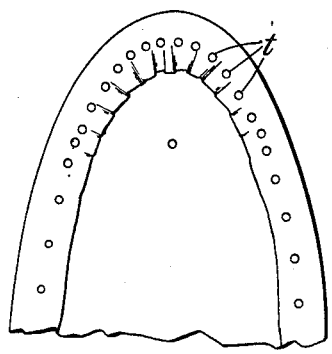
Fig. 33 is a plan view showing the bottom of the forepart of the shoe as it appears after the operation of the machine thereon.

When the wipers 2 are in their fully advanced and closed positions there is a V-shaped opening between them at the end of the toe, as common in lasting machines and as shown in Fig. 32, and three of the tacks are driven into the shoe in this V-shaped opening. When the parts of the tacker mechanism are in their starting positions one of the tackers is located at the extreme end of the toe with its raceway 340 in alinement with the tack supply raceway 474, as hereinbefore explained, this being the position in which that tacker drove its last tack midway between the sides of the above-mentioned V-shaped opening in operating on the preceding shoe. In view of the initial relation between the groove cam 144 (Fig. 6) which advances the tackers to their different tacking positions and the groove cam 414 which controls the valve 402, the cam shaft 146 at the beginning of its movement causes the two tackers to move to their next tacking positions before the valve 402 is operated to admit compressed air to the tubes 410 leading to the tackers and to the pipes 426 leading to the cylinders 78. The tacker at the end of the toe, therefore, drives its first tack in the V-shaped opening between the wipers adjacent to one side of that opening, and near the end of the tacking operation the other tacker drives two tacks in that opening, the last tack being the central tack. In operating on the next shoe the two tackers similarly receive their first positioning movements before driving any tacks, and accordingly the tacker which drove two tacks in the V-shaped opening in operating on the preceding shoe drives a single tack in that opening at one side thereof. To provide sufficient room for the tack fingers 372 when they drive tacks in the V-shaped opening in locations adjacent to the wipers, portions of the wipers at the sides of the opening have recesses 608 therein (Figs. 30 and 32). It will be understood that preparatory to the driving of a tack in the V-shaped opening either tacker is lowered by downward movement of the tacker support 36, the same as when the tacks are driven through the openings 4 in the wipers.

The manner of operation of the machine, in so far as it is of interest with reference to the present invention, will now be briefly summarized. The operator presents a shoe to the machine with the bottom of its forepart under the shoe-positioning plate 28, which determines the position of the shoe heightwise during the operation of the machine, its position in other respects being determined as disclosed in the copending application of which this application is a division. The operator then starts the cycle of operations of the machine by depressing the treadle 14, whereupon the toe rest 30 is moved upwardly and clamps the shoe against the plate 28. Near the beginning of the cycle also the heel rest 34 is moved rearwardly into engagement with the heel end face of the shoe. In the course of the cycle of operations the wipers 2 are thereafter operated to wipe the upper around the toe end of the last into lasted position in the manner fully disclosed in the copending application. As the wipers begin to wipe the marginal portion of the upper inwardly over the insole the cam 68 (Fig. 1) swings the lever 62 and thereby turns the shaft 48, thereby advancing the tacker support 36 lengthwise of the shoe and swinging its downwardly to carry the tackers 96 into positions for the tacking operation, the downward movement of the support being limited by engagement of the stems 84 (Figs. 6 and 10) of the pistons 80 with the plates 85. The tacker support having arrived in this position and the wipers being fully advanced and closed over the insole, the parts of the clutch 6 are automatically disconnected to cause the cam shaft 12 to come to a stop, thus providing a pause in the cycle of operations to permit the driving of the tacks by the independently controlled tacking mechanism.

To initiate the tacking operation the operator actuates the clutch 172 (Fig. 15) by depression of the lever 264, the pin 230 being simultaneously withdrawn from one of the holes 280 in the disk 168 to release the shaft 170. As hereinbefore explained, the cam 144 (Fig. 6) first acts to advance the tackers one step before the cam 414 moves the valve 402 into position to admit compressed air to the tubes 410 leading to the tackers. By this valve compressed air is at the same time admitted to the cylinders 78 (Fig. 10) under the pistons 80 to raise the pistons and thus to cause a further downward movement of the tacker support 36 and the tackers to position the tack fingers 372 closer to the shoe. In response to this downward movement of the tacker support engagement of the rods 462 (Fig. 28) with the wipers causes the valves 432 (Fig. 25) to move downwardly and to admit compressed air from the tubes 410 to the cylinders 318, whereupon the pistons 320 are forced downwardly to operate the driver bars 300 and thus to drive the tacks. When, however, either of the rods 462 is positioned over one of the openings 464 (Fig. 32) in the wipers, the corresponding valve 432 is not operated and no tack is driven by that tacker in that location. As hereinbefore fully explained, the tacker which is located initially at the end of the toe drives its first tack in the V-shaped opening between the wipers adjacent to one side of that opening. The valve 402 is next moved by its cam 414 into position to release the air from the tubes 410 and the cylinders 78. The release of the air from these cylinders causes the springs 82 to raise the tacker support 36 far enough for the tack fingers to clear the wipers when the tackers are next advanced, and this upward movement of the tacker support causes the valves 432 to be returned by their springs 444 to interrupt communication between the cylinders 318 and the tubes 410 and to establish communication between the ports 436 and the passages 442 for exhaust of the air from the cylinders 318, thus causing return of the tack drivers 304. Thereafter the tackers are further advanced step by step to their different tacking positions, the tacker which began its operation at the end of the toe being moved progressively farther from that location and the other tacker at the same time approaching the end of the toe. As the tackers are thus advanced their positions with respect to inward or outward movements transversely of the edge of the shoe bottom are determined by the cams 114 through the slides 110, the gears 100 and the slides 94 to cause the tacks to be driven through the openings 4 in the wipers at the proper distances from the edge of the shoe bottom. The tacker which approaches the end of the toe drives its last two tacks in the V-shaped opening between the wipers, and as it arrives in position for driving its last tack in a central location in that opening its raceway 340 is moved into alinement with the tack supply raceway 474 (Fig. 11) to receive from the latter a supply of tacks, the gate member 498 being swung into position to release the tacks in the tack supply raceway by engagement of the raceway 340 with one or the other of the pins 508 and the tack-retaining member 470 being moved by the member 482 into position to open the upper end of the tacker raceway. After the tackers have arrived at the limits of their positioning movements the valve 402 is further operated to cause the driving of the last tack or tacks and is then returned to exhaust position, at which time the parts of the clutch 172 (Fig. 15) are disconnected by the spring 282, the pin 230 entering that hole 280 in the disk 168 which is diametrically opposite the hole in which it was first positioned.

The tacking operation having thus been completed, the operator again actuates the clutch 6 by depression of the treadle 14 to cause the completion of the cycle of operations and the return of the parts to starting positions. In this part of the cycle the tacker support 36 is swung upwardly and moved rearwardly to its initial position by reverse swinging movement of the lever 62.

It will be understood that during the operations of the tacking mechanism the tack hopper 514 is normally rotated continuously to maintain a supply of tacks in the tack supply raceway 474, although the rotation of the hopper may be stopped at any time, if desired, by moving the arm 572 (Figs. 16 and 17) into position to disconnect the clutch teeth 556 from the teeth 558.

Having described the invention, what I claim as new and desire to secure by Letters Patent of the United States is:

1. In a shoe machine, the combination with shoe-positioning means, of mechanism for inserting fastenings progressively along the margin of the shoe bottom around an end of the shoe, said mechanism comprising a pair of fastening-inserting devices arranged respectively to insert fastenings in the opposite side portions of the end of the shoe bottom, and means for moving said devices in curved paths along the margin of the shoe bottom to different fastening-inserting positions successively between their fastening-inserting operations.

2. In a shoe machine, the combination with shoe-positioning means, of mechanism for inserting fastenings progressively along the margin of the shoe bottom around an end of the shoe, said mechanism comprising a pair of fastening-inserting devices arranged respectively to insert fastenings in the opposite side portions of the end of the shoe bottom, and cam-operated means connected to said devices for moving them simultaneously in curved paths along the margin of the shoe bottom to different fastening-inserting positions successively.

3. In a shoe machine, the combination with shoe-positioning means, of mechanism for inserting fastenings progressively along the margin of the shoe bottom around an end of the shoe, said mechanism comprising a pair of fastening-inserting devices arranged respectively to insert fastenings in the opposite side portions of the end of the shoe bottom, means for moving one of said devices from a fastening-inserting position substantially at the extreme end of the shoe bottom to other fastening-inserting positions successively farther from said extreme end, and additional means for simultaneously moving the other of said devices to fastening-inserting positions successively nearer said extreme end.

4. In a shoe machine, the combination with shoe-positioning means, of mechanism for inserting fastenings progressively along the margin of the shoe bottom around an end of the shoe, said mechanism comprising a pair of fastening-inserting devices arranged respectively to insert fastenings in the opposite side portions of the end of the shoe bottom, and means for moving said devices along the margin of the shoe bottom, one in a direction away from the extreme end of the shoe bottom and the other simultaneously in a direction toward said extreme end, to different fastening-inserting positions successively in operating on one shoe and for reversing the directions of such positioning movements of the devices in operating on the next shoe.

5. In a shoe machine, the combination with shoe-positioning means, of mechanism for inserting fastenings progressively along the margin of the shoe bottom around an end of the shoe, said mechanism comprising a pair of fastening-inserting devices arranged respectively to insert fastenings in the opposite side portions of the end of the shoe bottom, said devices being mounted for movements in curved paths along the margin of the shoe bottom to different fastening-inserting positions, a member connected to both said devices for thus moving one of them in a direction away from the extreme end of the shoe bottom and the other simultaneously in a direction toward said extreme end by movement of said member in one direction and for reversing the directions of movement of the devices when the member is moved in the opposite direction, and means for moving said member in one direction in operating on one shoe and in the opposite direction in operating on the next shoe.

6. In a shoe machine, the combination with shoe-positioning means, of mechanism for inserting fastenings progressively along the margin of the shoe bottom around an end of the shoe, said mechanism comprising a pair of fastening-inserting devices arranged respectively to insert fastenings in the opposite side portions of the end of the shoe bottom, said devices being mounted for movements in curved paths along the margin of the shoe bottom to different fastening-inserting positions, a member mounted for swinging movement and connected to both said devices for thus moving one of them in a direction away from the extreme end of the shoe bottom and the other simultaneously in a direction toward said extreme end, and means for operating said member intermittently to move the devices to their different fastening-inserting positions.

7. In a shoe machine, the combination with shoe-positioning means, of mechanism for inserting fastenings progressively along the margin of the shoe bottom around an end of the shoe, said mechanism comprising a pair of fastening-inserting devices arranged respectively to insert fastenings in the opposite side portions of the end of the shoe bottom, said devices being mounted for movements in curved paths along the margin of the shoe bottom to different fastening-inserting positions, a member mounted for swinging movement and connected to both said devices for thus moving one of them in a direction away from the extreme end of the shoe bottom and the other simultaneously in a direction toward said extreme end, said member having a plurality of projections thereon, and a cam constructed and arranged to engage said projections in succession to operate said member.

8. In a shoe machine, the combination with shoe-positioning means, of mechanism for inserting fastenings progressively along the margin of the shoe bottom around an end of the shoe, said mechanism comprising a pair of fastening-inserting devices arranged respectively to insert fastenings in the opposite side portions of the end of the shoe bottom, said devices being mounted for movements in curved paths along the margin of the shoe bottom to different fastening-inserting positions, a member mounted for swinging movement and connected to both said devices for thus moving one of them in a direction away from the extreme end of the shoe bottom and the other simultaneously in a direction toward said extreme end, said member having a plurality of projections thereon, and a rotatable cam constructed and arranged to engage said projections in succession to operate said member, said cam being so formed as to operate said member intermittently and thus to cause the fastening-inserting devices to pause in their different fastening-inserting positions.

9. In a shoe machine, the combination with shoe-positioning means, of mechanism for inserting fastenings progressively along the margin of the shoe bottom around an end of the shoe, said mechanism comprising a pair of fastening-inserting devices arranged respectively to insert fastenings in the opposite side portions of the end of the shoe bottom, said devices being mounted for movements in curved paths along the margin of the shoe bottom to different fastening-inserting positions, a member mounted for swinging movement about an axis extending heightwise of the shoe, links connecting said member respectively to the different fastening-inserting devices, said member and links being so arranged as to move one of the devices in a direction away from the extreme end of the shoe bottom and the other simultaneously in a direction toward said extreme end by swinging movement of said member in one direction, and means for thus swinging said member.

10. In a shoe machine, the combination with shoe-positioning means, of mechanism for inserting fastenings progressively along the margin of the shoe bottom around an end of the shoe, said mechanism comprising a pair of fastening-inserting devices arranged respectively to insert fastenings in the opposite side portions of the end of the shoe bottom, said devices being mounted for movements in curved paths along the margin of the shoe bottom to different fastening-inserting positions, a member mounted for swinging movements about an axis extending heightwise of the shoe, links connecting said member respectively to the different fastening-inserting devices, said member and links being so arranged as to move one of the devices in a direction away from the extreme end of the shoe bottom and the other simultaneously in a direction toward said extreme end by movement of said member in one direction and to reverse the directions of movement of said devices when the member is moved in the opposite direction, and means for thus moving said member in one direction in operating on one shoe and in the opposite direction in operating on the next shoe.

11. In a shoe machine, the combination with shoe-positioning means, of mechanism for inserting fastenings progressively along the margin of the shoe bottom around an end of the shoe, said mechanism comprising a pair of fastening-inserting devices arranged respectively to insert fastenings in the opposite side portions of the end of the shoe bottom, said devices being mounted for movements in curved paths along the margin of the shoe bottom to different fastening-inserting positions, a member mounted for swinging movements and connected to both said devices for thus moving one of them in a direction away from the extreme end of the shoe bottom and the other simultaneously in a direction toward said extreme end by movement of said member in one direction and for reversing the directions of movement of said devices when the member is moved in the opposite direction, a cam rotatable in opposite directions to move said member in opposite directions respectively, and means for rotating said cam in one direction in operating on one shoe and in the opposite direction in operating on the next shoe.

12. In a shoe machine, the combination with shoe-positioning means, of a device for inserting fastenings successively in different locations along the margin of the shoe bottom, said device being mounted for movement along said margin, a member connected to said device and having a plurality of projections thereon, and a cam constructed and arranged to engage said projections in succession and thereby to move said device to different fastening-inserting positions.

13. In a shoe machine, the combination with shoe-positioning means, of a device for inserting fastenings successively in different locations along the margin of the shoe bottom, said device being mounted for movement along said margin, a member connected to said device and having a plurality of projections thereon, and a rotatable cam constructed and arranged to engage said projections in succession and thereby to move said device intermittently to different fastening-inserting positions.

14. In a shoe machine, the combination with shoe-positioning means, of mechanism for inserting fastenings progressively along the margin of the shoe bottom around an end of the shoe, said mechanism comprising a pair of fastening-inserting devices arranged respectively to insert fastenings in the opposite side portions of the end of the shoe bottom and supported for movements along the margin of the shoe bottom to different fastening-inserting positions, means for thus moving said devices, the devices being further supported for inward and outward movements in directions transverse to the edge of the shoe bottom, and cam means relatively to which the devices are movable along the margin of the shoe bottom for determining their positions with respect to such inward and outward movements and for thereby determining the distances from the edge of the shoe bottom at which the fastenings are inserted.

15. In a shoe machine, the combination with shoe-positioning means, of mechanism for inserting fastenings progressively along the margin of the shoe bottom around an end of the shoe, said mechanism comprising a pair of fastening-inserting devices arranged respectively to insert fastenings in the opposite side portions of the end of the shoe bottom and supported for movements along the margin of the shoe bottom to different fastening-inserting positions, means for thus moving said devices, the devices being further supported for inward and outward movements in directions transverse to the edge of the shoe bottom, cam members relatively to which the devices are movable along the margin of the shoe bottom, said members having cam slots therein, and means movable with the devices along the margin of the shoe bottom and extending into said cam slots for determining the positions of the devices with respect to such inward and outward movements and for thereby determining the distances from the edge of the shoe bottom at which the fastenings are inserted.

16. In a shoe machine, the combination with shoe-positioning means, of mechanism for inserting fastenings progressively along the margin of the shoe bottom around an end of the shoe, said mechanism comprising a pair of fastening-inserting devices arranged respectively to insert fastenings in the opposite side portions of the end of the shoe bottom and supported for movements along the margin of the shoe bottom to different fastening-inserting positions, means for thus moving said devices, the devices being further supported for inward and outward movements in directions transverse to the edge of the shoe bottom, cam members relatively to which the devices are movable along the margin of the shoe bottom, said members having cam slots therein, and rack-and-pinion mechanisms movable with the devices along the margin of the shoe bottom and having portions thereof extending into said cam slots for determining the positions of the devices with respect to such inward and outward movements and for thereby determining the distances from the edge of the shoe bottom at which the fastenings are inserted.

17. In a shoe machine, the combination with shoe-positioning means, of mechanism for inserting fastenings progressively along the margin of the shoe bottom around an end of the shoe, said mechanism comprising a pair of fastening-inserting devices arranged respectively to insert fastenings in the opposite side portions of the end of the shoe bottom and supported for movements along the margin of the shoe bottom to different fastening-inserting positions, means for thus moving said devices, the devices being further supported for inward and outward movements in directions transverse to the edge of the shoe bottom, rack-and-pinion mechanisms mounted to move with the devices along the margin of the shoe bottom for controlling them with respect to such inward and outward movements, and cam means relatively to which the rack-and-pinion mechanisms are thus movable for controlling said mechanisms and for thereby determining the distances from the edge of the shoe bottom at which the fastenings are inserted.

18. In a shoe machine, the combination with shoe-positioning means, of mechanism for inserting fastenings progressively along the margin of the shoe bottom around an end of the shoe, said mechanism comprising a pair of fastening-inserting devices arranged respectively to insert fastenings in the opposite side portions of the end of the shoe bottom, members supporting said devices and guided for movements in curved paths along the margin of the shoe bottom to carry the devices to different fastening-inserting positions, means for thus moving said members, slides supported on said members for inward and outward movements in directions transverse to the edge of the shoe bottom and on which said devices are mounted, and cam means relatively to which said members are movable along the margin of the shoe bottom for controlling said slides with respect to such inward and outward movements and for thereby determining the distances from the edge of the shoe bottom at which the fastenings are inserted.

19. In a shoe machine, the combination with shoe-positioning means, of mechanism for inserting fastenings progressively along the margin of the shoe bottom around an end of the shoe, said mechanism comprising a pair of fastening-inserting devices arranged respectively to insert fastenings in the opposite side portions of the end of the shoe bottom, members supporting said devices and guided for movements in curved paths along the margin of the shoe bottom to carry the devices to different fastening-inserting positions, means for thus moving said members, slides supported on said members for inward and outward movements in directions transverse to the edge of the shoe bottom, mechanisms connected to said slides and movable with them along the margin of the shoe bottom for controlling them with respect to such inward and outward movements, and cam means relatively to which said controlling mechanisms are thus movable for controlling said mechanisms and for thereby determining the distances from the edge of the shoe bottom at which the fastenings are inserted.

20. In a shoe machine, the combination with shoe-positioning means, of a device for inserting fastenings successively in different locations along the margin of the shoe bottom, means for moving said device along said margin to different fastening-inserting positions, the device being supported for inward and outward movements in directions transverse to the edge of the shoe bottom, a cam member relatively to which the device is movable along the margin of the shoe bottom, said member having a cam slot therein, and means connected to said device and movable along said cam slot for determining the position of the device with respect to such inward and outward movements and for thereby determining the distances from the edge of the shoe bottom at which the fastenings are inserted.

21. In a shoe machine, the combination with shoe-positioning means, of a device for inserting fastenings successively in different locations along the margin of the shoe bottom, means for moving said device along said margin to different fastening-inserting positions, the device being supported for inward and outward movements in directions transverse to the edge of the shoe bottom, rack-and-pinion mechanism mounted to move with the device along the margin of the shoe bottom for controlling it with respect to such inward and outward movements, and a cam relatively to which the rack-and-pinion mechanism is thus movable for controlling said mechanism and for thereby determining the distances from the edge of the shoe bottom at which the fastenings are inserted.

22. In a shoe machine, the combination with shoe-positioning means, of a device for inserting fastenings successively in different locations along the margin of the shoe bottom, a member supporting said device and guided for movement along the margin of the shoe bottom to carry the device to different fastening-inserting positions, means for thus moving said member, a slide supported on said member for inward and outward movements in directions transverse to the edge of the shoe bottom and on which said device is mounted, and a cam relatively to which said member and slide are movable along the margin of the shoe bottom for controlling the slide with respect to such inward and outward movements and for thereby determining the distances from the edge of the shoe bottom at which the fastenings are inserted.

23. In a shoe machine, the combination with shoe-positioning means, of a device for inserting fastenings successively in different locations along the margin of the shoe bottom, a member supporting said device and guided for movement along the margin of the shoe bottom to carry the device to different fastening-inserting positions, means for thus moving said member, a slide supported on said member for inward and outward movements in directions transverse to the edge of the shoe bottom and on which said device is mounted, mechanism connected to said slide and movable with it along the margin of the shoe bottom for controlling it with respect to such inward and outward movements, and a cam member having a cam slot therein along which a portion of said controlling mechanism is movable for controlling said mechanism and for thereby determining the distances from the edge of the shoe bottom at which the fastenings are inserted.

24. In a shoe machine, the combination with shoe-positioning means, of mechanism for inserting fastenings progressively along the margin of the shoe bottom around an end of the shoe, said mechanism comprising a pair of fastening-inserting devices arranged respectively to insert fastenings in the opposite side portions of the end of a shoe bottom, means for moving said devices along the margin of the shoe bottom to different fastening-inserting positions, each of the devices thus movable including a raceway for fastenings, and another raceway arranged to supply fastenings alternately to the raceways of said devices.

25. In a shoe machine, the combination with shoe-positioning means, of mechanism for inserting fastenings progressively along the margin of the shoe bottom around an end of the shoe, said mechanism comprising a pair of fastening-inserting devices arranged respectively to insert fastenings in the opposite side portions of the end of the shoe bottom, means for moving said devices simultaneously along the margin of the shoe bottom, one from a position substantially at the extreme end of the shoe bottom in operating on one shoe and the other from a position substantially at the extreme end of the shoe bottom in operating on the next shoe, each of the devices thus movable including a raceway for fastenings, and another raceway arranged to supply fastenings to the raceway of each of said devices when that device is in a position substantially at the extreme end of the shoe bottom.

26. In a shot machine, the combination with shoe-positioning means, of mechanism for inserting fastenings progressively along the margin of the shoe bottom around an end of the shoe, said mechanism comprising a pair of fastening-inserting devices arranged respectively to insert fastenings in the opposite side portions of the end of the shoe bottom, means for moving said devices along the margin of the shoe bottom, one from a position substantially at the extreme end of the shoe bottom in a direction away from said extreme end and the other simultaneously in a direction toward said extreme end, to different fastening-inserting positions in operating on one shoe and for reversing the directions of such positioning movements of the devices in operating on the next shoe, each of the devices thus movable including a raceway for fastenings, and a supply raceway into alinement with which the raceway of each of said devices is carried by the movement of each device toward the extreme end of the shoe bottom to receive fastenings from the supply raceway.

27. In a shoe machine, the combination with shoe-positioning means, of mechanism for inserting fastenings progressively along the margin of the shoe bottom around an end of the shoe, said mechanism comprising a pair of fastening-inserting devices arranged respectively to insert fastenings in the opposite side portions of the end of the shoe bottom, means for moving said devices along the margin of the shoe bottom, one from a position substantially at the extreme end of the shoe bottom in a direction away from said extreme end and the other simultaneously in a direction toward said extreme end, to different fastening-inserting positions in operating on one shoe and for reversing the directions of such positioning movements of the devices in operating on the next shoe, each of the devices thus movable including a raceway for fastenings, a supply raceway into alinement with which the raceway of each of said devices is carried by the movement of each device toward the extreme end of the shoe bottom to receive fastenings from the supply raceway, and a member arranged normally to retain the fastenings in the supply raceway but to be displaced to release the fastenings in response to movement of either of the other raceways into alinement with the supply raceway.

28. In a shoe machine, the combination with shoe-positioning means, of a device for inserting fastenings successively in different locations along the margin of the shoe bottom, means for moving said device along said margin to different fastening-inserting positions, the device thus movable including a raceway for fastenings, and a supply raceway into alinement with which said first-named raceway is carried by the movement of the device along the margin of the shoe bottom to receive fastenings from the supply raceway.

29. In a shoe machine, the combination with shoe-positioning means, of a device for inserting fastenings successively in different locations along the margin of the shoe bottom, means for moving said device along said margin to different fastening-inserting positions, the device thus movable including a raceway for fastenings, a supply raceway into alinement with which said first-named raceway is carried by the movement of the device along the margin of the shoe bottom to receive fastenings from the supply raceway, and a member arranged normally to retain the fastenings in the supply raceway but to be displaced to release the fastenings by the movement of the first-named raceway into alinement with the supply raceway.

30. In a shoe machine, the combination with shoe-positioning means, of a device for inserting fastenings successively in different locations along the margin of the shoe bottom, means for moving said device along said margin to different fastening-inserting positions, the device thus movable including a raceway for fastenings, a supply raceway into alinement with which said first-named raceway is carried by the movement of the device along the margin of the shoe bottom to receive fastenings from the supply raceway, a member at the delivery end of the supply raceway arranged normally to retain the fastenings in that raceway but to be displaced to release the fastenings by the movement of the first-named raceway into alinement with the supply raceway, and another retaining member at the receiving end of the first-named raceway arranged also to be displaced by the movement of that raceway into alinement with the supply raceway.

31. In a shoe machine, the combination with shoe-positioning means, of a device for inserting fastenings successively in different locations along the margin of the shoe bottom, means for moving said device along said margin to different fastening-inserting positions, the device thus movable including a raceway for fastenings, and a supply raceway into alinement with which said first-named raceway is carried by the movement of the device along the margin of the shoe bottom to receive fastenings from the supply raceway, the delivery end portion of said supply raceway comprising a member mounted for yielding movement in a direction lengthwise of that raceway in the event of an obstruction between the two raceways.

32. In a shoe machine, the combination with shoe-positioning means, of a device for inserting fastenings successively in different locations along the margin of the shoe bottom, means for moving said device along said margin to different fastening-inserting positions, the device thus movable including a raceway for fastenings, a supply raceway into alinement with which said first-named raceway is carried by the movement of the device along the margin of the shoe bottom to receive fastenings from the supply raceway, the delivery end portion of the supply raceway comprising a member pivotally mounted for swinging movement in a direction lengthwise of that raceway in the event of an obstruction between the two raceways, and spring means against the resistance of which said delivery end portion is thus movable.

LESTER S. MACDONALD.

REFERENCES CITED

The following references are of record in the file of this patent:

UNITED STATES PATENTS

| Number | Name | Date |
|---|---|---|
| 1,030,819 | Keith | June 25, 1912 |
| 1,394,806 | Blake | Oct. 25, 1921 |
| 2,362,480 | Gleissner | Nov. 14, 1944 |